US006528128B2

(12) United States Patent
Ito et al.

(10) Patent No.: US 6,528,128 B2
(45) **Date of Patent: *Mar. 4, 2003**

(54) METHOD OF TREATING A SUBSTRATE

(75) Inventors: Shinichi Ito, Yokohama (JP); Katsuya Okumura, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/553,480

(22) Filed: Apr. 20, 2000

(65) Prior Publication Data

US 2003/0012889 A1 Jan. 16, 2003

(30) Foreign Application Priority Data

Apr. 21, 1999 (JP) .......................................... 11-113660

(51) Int. Cl.7 .................................................. C08J 7/04

(52) U.S. Cl. ....................... 427/512; 427/240; 427/299; 427/430.1

(58) Field of Search ............................. 427/240, 430.1, 427/512, 299

(56) References Cited

U.S. PATENT DOCUMENTS

| | | | | |
|---|---|---|---|---|
| 3,198,657 | A | * | 8/1965 | Kimball et al. |
| 4,207,356 | A | * | 6/1980 | Waugh |
| 4,656,063 | A | * | 4/1987 | Long et al. |
| 4,753,819 | A | * | 6/1988 | Shimada |
| 5,395,803 | A | * | 3/1995 | Adams |
| 5,474,807 | A | * | 12/1995 | Koshiishi |
| 5,863,603 | A | * | 1/1999 | Sandhu et al. |
| 6,048,582 | A | * | 4/2000 | Schwiezer et al. |

FOREIGN PATENT DOCUMENTS

| | | |
|---|---|---|
| JP | 6-33849 | 12/1994 |
| JP | 7-36195 | 2/1995 |
| JP | 08-031729 | 2/1996 |
| JP | 10-223507 | 8/1998 |
| JP | 3265238 | 2/1999 |

* cited by examiner

*Primary Examiner*—Bernard Pianalto
(74) *Attorney, Agent, or Firm*—Finnegan, Henderson, Farabow, Garrett & Dunner, L.L.P.

(57) ABSTRACT

A substrate-treating method, which comprises the steps of, discharging a chemical liquid from a chemical liquid feeder to a chemical liquid-transporting face of a chemical liquid supplier, the chemical liquid-transporting face being disposed parallel with or inclined to a main surface of the substrate which is held in an approximately horizontal state, and moving the chemical liquid supplier in relative to the substrate while allowing the chemical liquid discharged from the chemical liquid feeder to flow over the chemical liquid-transporting face in a manner where the surface of chemical liquid is opened to ambient atmosphere. The chemical liquid discharged from the chemical liquid feeder and flowing over the chemical liquid-transporting face is fed to the substrate in state where the feeding speed and pressure of the chemical liquid are reduced due to relative moving between the chemical liquid supplier and the substrate.

9 Claims, 15 Drawing Sheets

FIG. 1A
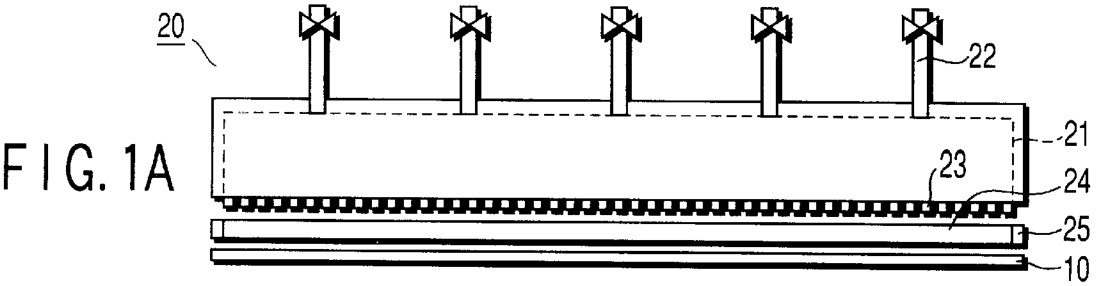
FIG. 1B
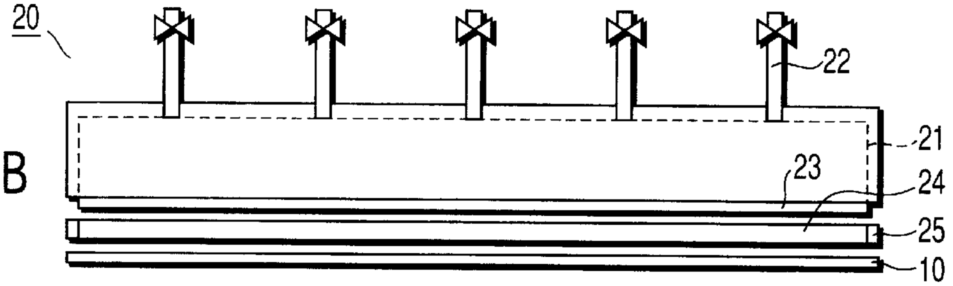
FIG. 1C
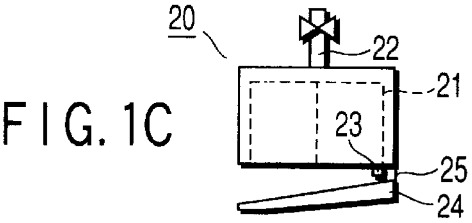
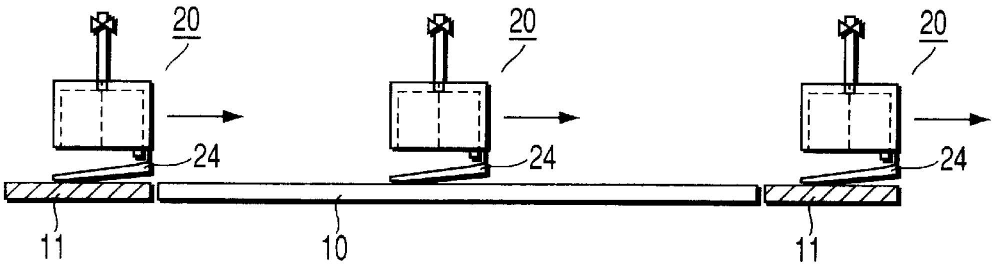
FIG. 2
FIG. 3
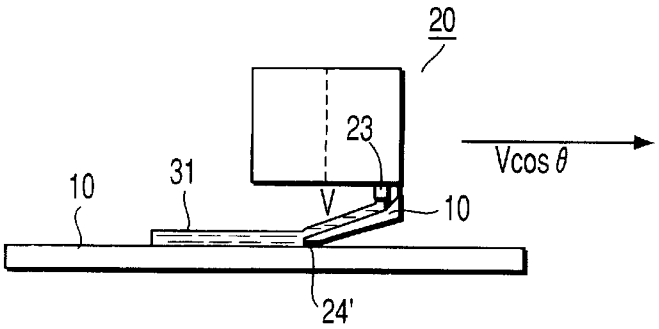

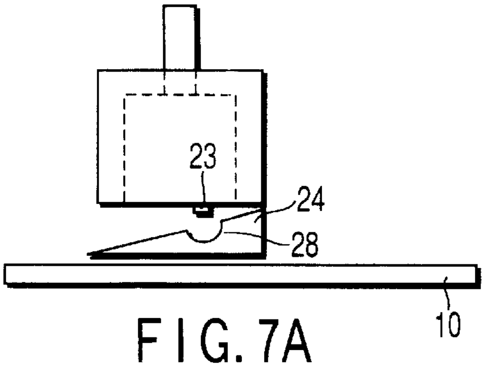
FIG. 7A
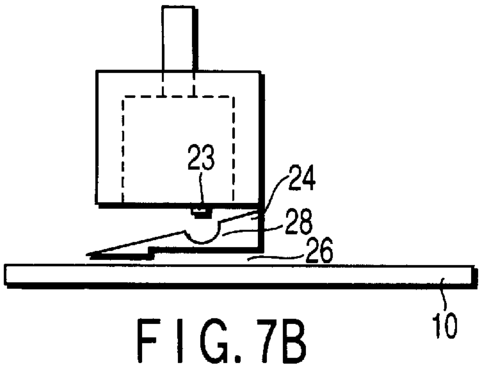
FIG. 7B
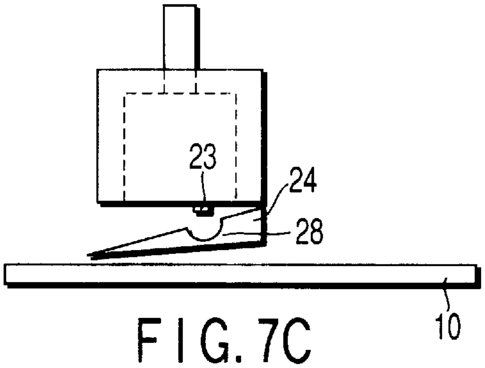
FIG. 7C
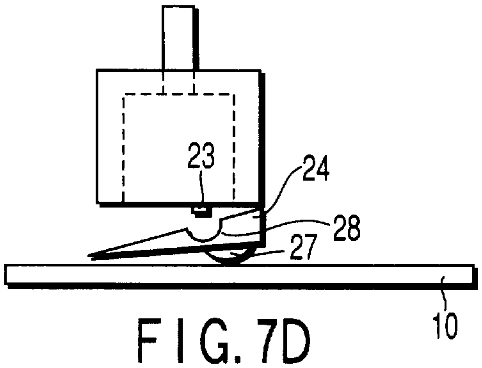
FIG. 7D
FIG. 8A
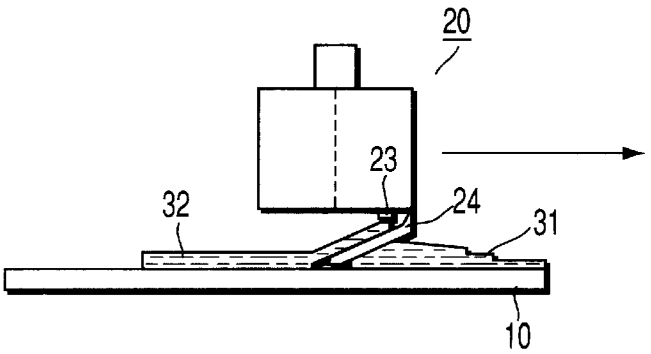
FIG. 8B
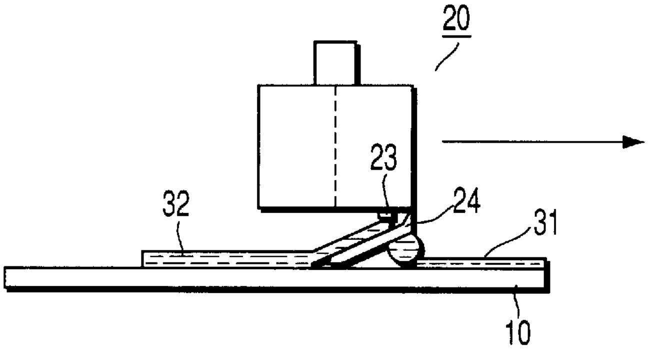

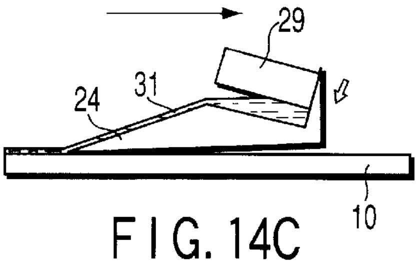
FIG. 14C
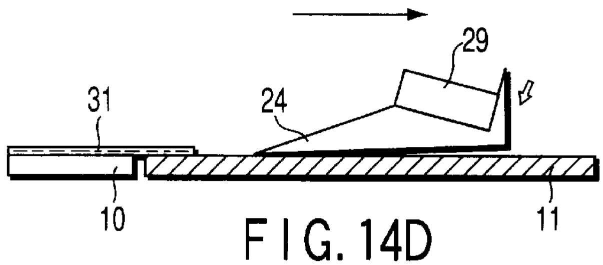
FIG. 14D
FIG. 15A
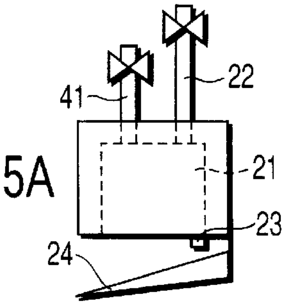
FIG. 15B
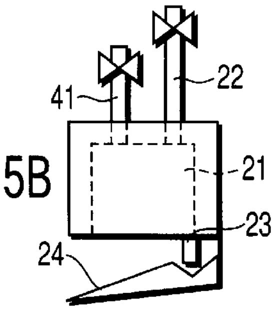
FIG. 16A
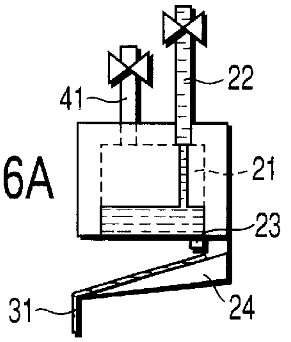
FIG. 16B
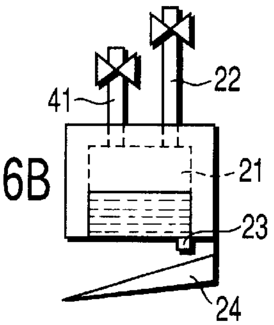
FIG. 16C
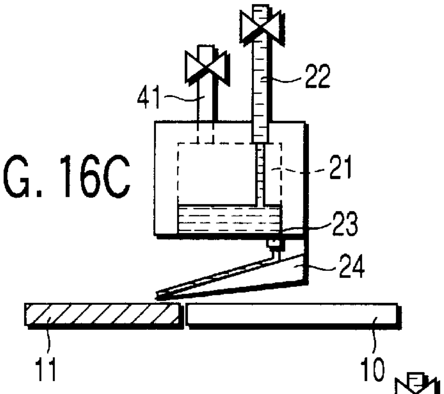
FIG. 16D
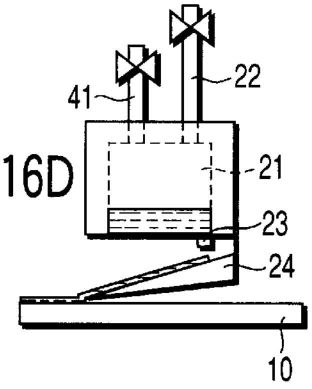
FIG. 16E
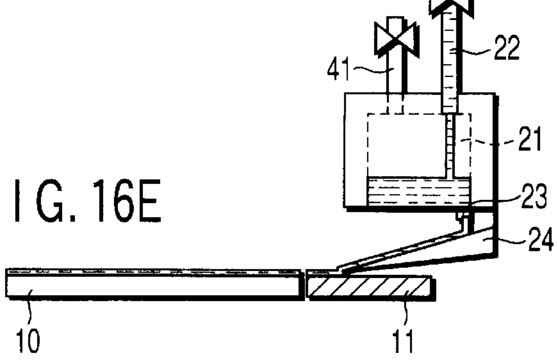
FIG. 16F
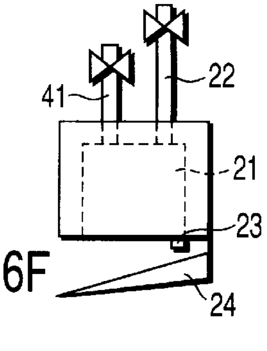

METHOD OF TREATING A SUBSTRATE

CROSS-REFERENCE TO RELATED APPLICATIONS

This application is based upon and claims the benefit of priority from the prior Japanese Patent Application No. 11-113660, filed Apr. 21, 1999, the entire contents of which are incorporated herein by reference.

BACKGROUND OF THE INVENTION

This invention relates to a substrate-treating technique in the manufacturing process of a semiconductor device, and in particular, to a substrate-treating device and a substrate-treating method for effectively feeding a chemical to the surface of a substrate for the treatment thereof.

In the manufacturing process of a semiconductor device or a liquid display device, the surface of substrate is subjected to various treatments or workings, thereby ultimately forming a fine pattern to provide the device with a desired function. In order to perform such treatments of substrate, not only a dry process using a gas, but also a wet process using a chemical solution are widely employed. This wet process is employed for instance in a development treatment to be performed after the exposure of a photosensitive resist, in the working of an exposure chromium mask, in the removal of undesired organic substance that has been adhered onto a substrate, in the removal of a photosensitive resist pattern left remained after finishing an etching treatment, or in a metal-plating on the surface of a silicon wafer.

There are known, as a wet process, a dipping method wherein a substrate is dipped in a solution of chemicals (or a chemical liquid) and a paddling method wherein a substrate is treated by feeding a chemical liquid to the main surface of the substrate. Since the dipping method is accompanied with problems that a large quantity of chemicals is required and the substrate may be contaminated through the reverse side thereof, the paddling method is increasingly substituted for the dipping method.

According to the conventional paddling method, a chemical is fed to the surface of substrate from a chemical supply source which is disposed above the substrate while allowing the substrate to rotate, the back side thereof being fixed by means of a vacuum chuck. However, since the delivery pressure of the chemical liquid as well as the quantity per unit area of a chemical liquid to be fed to the central surface portion of substrate are caused to differ from those to be fed to the marginal surface portion of the substrate according to this conventional method, it is impossible to achieve a high working precision.

With a view to overcome this problem, Japanese Patent Unexamined Publication No. 7-36195 discloses a method wherein a chemical liquid is fed to the main surface of substrate while moving a chemical-feeding section from one side of the substrate to the other side thereof. By contrast to the aforementioned rotational paddling method, it is possible according to this method to minimize the aforementioned difference in delivery pressure and in quantity of chemicals to be fed per unit area of the substrate. This method is further modified as disclosed in Japanese Patent Unexamined Publication No. 8-31729.

Namely, Japanese Patent Unexamined Publication No. 8-31729 describes a technique wherein the chemical-feeding section is provided at a lower portion thereof with a slit-like discharge port which is extended orthogonal to the moving direction of the chemical-feeding section and has the same width as that of the substrate to be treated, thereby enabling a chemical to be fed perpendicular to the main surface of the substrate from the discharge port. However, this raises another problem that since the liquid is discharged perpendicularly from the slit-like discharge port and strongly impinges against the surface of substrate, a turbulent flow is caused to generate on the surface of the substrate. Further, as a result of this turbulent flow, a fresh chemical is caused to mix with a reaction product, thereby non-uniformly lowering the concentration of the chemical and hence, giving rise to a non-uniform processing.

Japanese Patent Unexamined Publication No. 8-31729 also discloses that the direction of feeding a chemical liquid is inclined relative to the surface of substrate, and the chemical liquid is delivered from a port which is arranged approximately parallel with the surface of substrate. However, since the transport and feeding of a chemical liquid is executed using a continuous tube with high pressure to feed into high flow-resistant tube, the solution is caused to be fed at a high pressure to the surface of substrate, thus causing a turbulent flow to be generated on the surface of the substrate.

According to the aforementioned methods, since a high feeding pressure is applied to the discharge port, even a slight difference in working precision of the discharge port would invite a difference in pressure as well as in flow rate, thus deteriorating the working precision of the substrate.

On the other hand, according to the techniques described in these publications, the moving speed of the chemical-feeding means is taken into account with regard to the forward portion in the moving direction of the chemical-feeding means so as not to allow the chemical liquid to get ahead of the chemical-feeding means. However, no consideration is taken into account with regard to the flowing of the chemical liquid toward the direction (chemicals-feeding direction) opposite to the moving direction of the chemical-feeding means. Therefore, according to the techniques of these publications, the chemicals supplied to the substrate are allowed to flow to the downstream side while being mixed with a reaction product. As a result, the reaction speed at the downstream side becomes slower, thus giving rise to a problem that the dimensional precision of worked substrate is deteriorated.

Further, Japanese Patent Unexamined Publication No. 10-223507 discloses a method wherein a chemical liquid is fed as shown in FIG. 5A from a discharge port via a transporting face arranged contiguous with the discharge port to the surface of substrate. According to this system, the angle for feeding a chemical liquid to the surface of substrate may be approximately perpendicular to the surface of substrate or slightly inclined to the surface of substrate. Although the discharge port portion according to this system is an open type, a chemical liquid is caused to be transported along the transporting face disposed contiguous with the discharge port, so that the feeding pressure of chemicals would not be weakened, thus causing a chemical liquid to be fed to the surface of substrate at a very high speed.

In FIG. 5A, the size of the arrows shown therein indicates the magnitude of the feeding speed of a chemical liquid. As shown herein, in this case also, a turbulent flow of the chemical liquid is caused to generate at the portion of substrate where the chemical liquid is fed, or a phenomenon wherein the chemical liquid is caused to flow in the feeding direction thereof, or a reaction product is caused to flow toward the downstream side would be generated. Due to these unstable factors, the working precision of substrate is caused to deteriorate even in this system.

As explained above, the conventional wet process is accompanied with a problem that since the pressure of feeding a chemical liquid to the main surface of substrate is high, a turbulent flow of the chemical liquid is caused to generate on the surface of the substrate, thereby giving rise to the deterioration of working precision of the substrate.

BRIEF SUMMARY OF THE INVENTION

Therefore, the object of the present invention is to provide a substrate-treating device which is capable of extremely lowering the velocity and feeding pressure of a chemical liquid on the occasion of feeding the chemical liquid to a substrate to be treated (hereinafter, referred to simply as a substrate), thereby enabling the working precision of the substrate to be improved.

Another object of the present invention is to provide a method of treating a substrate which is capable of extremely lowering the velocity and feeding pressure of a chemical liquid on the occasion of feeding the chemical liquid to a substrate to be treated, thereby enabling the working precision of the substrate to be improved.

Namely, according to this invention, there is provided a substrate-treating device comprising a substrate holder for approximately horizontally holding the substrate; a chemical liquid feeder having a chemical liquid delivery port for discharging a chemical liquid from a chemical liquid tank; a chemical liquid supplier disposed below the chemical liquid delivery port of the chemical liquid feeder and away from the chemical liquid delivery port, and having a chemical liquid-transporting face disposed parallel with or inclined to a main surface of the substrate for lowering the flowing velocity and pressure of the chemical liquid before feeding the chemical liquid discharged from the chemical liquid delivery port and flowing over the chemical liquid-transporting face to the main surface of the substrate; and moving mechanism for moving the chemical liquid supplier in relative to the substrate, wherein a relative moving speed between the substrate and the chemical liquid supplier is substantially the same with a velocity of the chemical liquid being fed from the chemical liquid supplier to the substrate; and a relative speed between the chemical liquid being fed from the chemical liquid supplier to the substrate and the substrate is substantially zero.

According to this invention, there is further provided a substrate-treating method, which comprises the steps of; discharging a chemical liquid from a chemical liquid feeder to a chemical liquid-transporting face of a chemical liquid supplier, the chemical liquid-transporting face being disposed parallel with or inclined to a main surface of the substrate which is held in an approximately horizontal state; and moving the chemical liquid supplier in relative to the substrate while allowing the chemical liquid discharged from the chemical liquid feeder to flow over the chemical liquid-transporting face; thereby enabling the chemical liquid discharged from the chemical liquid feeder and flowing over the chemical liquid-transporting face to be fed to an entire main surface of the substrate in state where the feeding velocity and pressure of the chemical liquid are reduced due to the relative movement between the chemical liquid supplier and the substrate, and a relative moving speed between the substrate and the chemical liquid supplier is substantially the same with a velocity of the chemical liquid being fed from the chemical liquid supplier to the substrate; and a relative speed between the chemical liquid being fed from the chemical liquid supplier to the substrate and the substrate is substantially zero.

According to this invention, there is further provided a substrate-treating method, which comprises the steps of; discharging a chemical liquid from a chemical liquid feeder to a chemical liquid-transporting face of a chemical liquid supplier, the chemical liquid-transporting face being disposed parallel with or inclined to a main surface of the substrate which is held in an approximately horizontal state, and the chemical liquid feeder having at least a couple of chemical liquid delivery ports which are mutually positioned in point symmetry with respect to the center of the substrate; and rotationally driving at least one of the substrate and the chemical liquid feeder during a moment when the chemical liquid discharged from the chemical liquid feeder is allowed to flow over the chemical liquid-transporting face in a manner where a surface of the chemical liquid is opened to ambient atmosphere; thereby enabling the chemical liquid discharged from the chemical liquid feeder and flowing over the chemical liquid-transporting face to be fed to an entire main surface of the substrate in state where the feeding velocity and pressure of the chemical liquid are reduced due to the rotational driving of at least one of the substrate and the chemical liquid feeder, and a relative moving speed between the substrate and the chemical liquid supplier is substantially the same with a velocity of the chemical liquid being fed from the chemical liquid supplier to the substrate; and a relative speed between the chemical liquid being fed from the chemical liquid supplier to the substrate and the substrate is substantially zero.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A, 1B and 1C respectively shows a schematical view of the construction of the substrate-treating device according to a first example of this invention;

FIG. 2 is a side view illustrating a moving state of the chemical liquid feeder and the chemical liquid transporting plate in the device shown in FIG. 1;

FIG. 3 is a side view illustrating a state wherein a chemical liquid is fed over a substrate by making use of the device shown in FIG. 1;

FIGS. 7A to 7D show various embodiments of the chemical liquid-transporting plate according to this invention;

FIGS. 8A and 8B show states wherein a second chemical liquid is being fed while removing a first chemical liquid by making use of a back surface of the chemical liquid-transporting plate;

FIGS. 14A to 14D illustrate a modified example of chemical liquid-feeding system;

FIGS. 15A and 15B respectively shows a schematical view of the construction of the substrate-treating device according to a third example of this invention;

FIGS. 16A to 16F illustrate the process of treating a substrate by making use of devices shown in FIGS. 15A and 15B;

DETAILED DESCRIPTION OF THE INVENTION

Figure 4A:
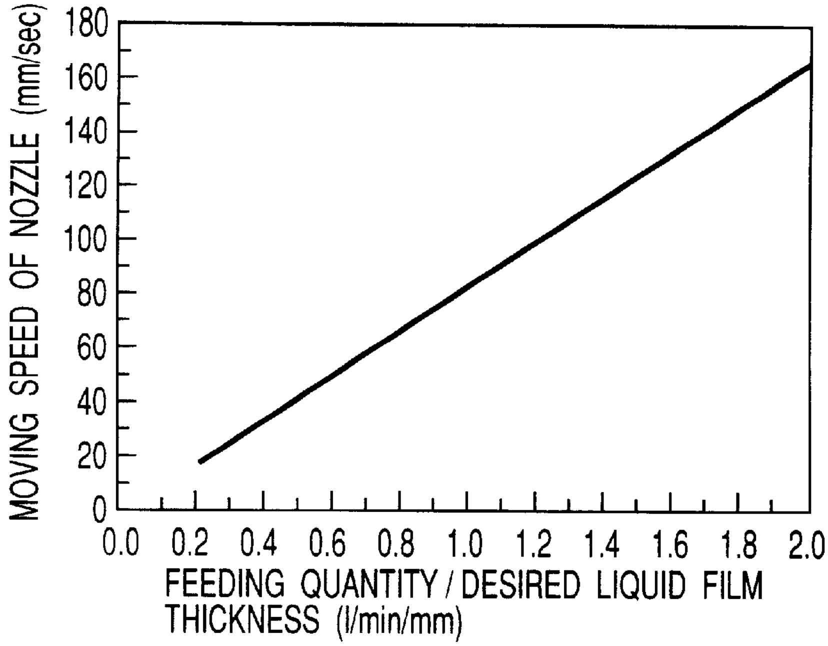
FIGS. 4A and 4B show a graph illustrating the relationships between the quantity supplied of chemical liquid and the thickness of the chemical liquid; and the relationships between the moving speed of nozzle and the angle of transporting plate, respectively.

The substrate-treating device according to a first embodiment of this invention is featured in that a substrate and a chemical liquid supplier are moved relative to each other, so that a chemical liquid discharged from a chemical liquid feeder and flowing over a chemical liquid-transporting face is enabled to be fed to the substrate in state where the feeding velocity and pressure of the chemical liquid are reduced.

The substrate-treating device according to the first embodiment of this invention can be constructed to have the following specific embodiments.

(1) The chemical liquid supplier is provided with a temporary chemical liquid-holding portion for temporary holding a chemical liquid, the temporary chemical liquid-holding portion being disposed below said chemical liquid delivery port.

(2) The substrate-treating device is further provided with a chemical liquid push-out member which is disposed adjacent to the temporary chemical liquid-holding portion for enabling it to be inserted into the chemical liquid-holding portion, thereby allowing the capacity of the chemical liquid-holding portion to become smaller to thereby feed the chemical liquid held in the chemical liquid-holding portion to the surface of the substrate.

(3) The substrate-treating device is further provided with a mechanism for moving or removing the chemical liquid existing in a space between the back surface of the chemical liquid supplier and the substrate, the mechanism being disposed on a side of the chemical liquid supplier which faces the substrate.

(4) The chemical liquid supplier is formed of a plate-like body, and an angle between the chemical liquid-transporting face of the plate-like body and the substrate is not more than 20°.

(5) The chemical liquid supplier is formed of a plate-like body, and an angle between the chemical liquid-transporting face of the plate-like body and the substrate is in the range of 10 to 20°.

(6) The main surface of the chemical liquid supplier is formed of a material selected from the group consisting of quartz, aluminum, alumina, polyvinyl chloride and a compound thereof.

(7) The chemical liquid tank of the chemical liquid feeder is connected with a chemical liquid inlet tube for introducing the chemical liquid.

(8) The chemical liquid tank of the chemical liquid feeder is connected with a pressure-releasing tube.

(9) The chemical liquid delivery port of the chemical liquid feeder is positioned at a level which is approximately the same with or lower than the top of main surface of the chemical liquid supplier.

(10) A washing liquid delivery port is disposed next to the chemical liquid delivery port of the chemical liquid feeder and is positioned at a level which is higher than the chemical liquid delivery port and also higher than the main surface of the chemical liquid supplier.

(11) The moving mechanism is designed to shift the chemical liquid supplier from a shift-starting point located outside the substrate through the surface of the substrate to a stop point located opposite to the shift-starting point and outside the substrate.

(12) An auxiliary plate is disposed around the substrate held by the substrate holder, the main surface of the auxiliary plate being positioned at a level approximately the same with that of the main surface of the substrate.

The substrate-treating method according to a second embodiment of this invention is featured in that a substrate and a chemical liquid supplier having a chemical liquid-transporting face are moved relative to each other, so that a chemical liquid discharged from a chemical liquid feeder and flowing over the chemical liquid-transporting face is enabled to be fed to the entire surface of the substrate in state where the feeding velocity and pressure of the chemical liquid are reduced, the relative moving speed between the substrate and the chemical liquid supplier is substantially the same with a velocity of the chemical liquid being fed from the chemical liquid supplier to the substrate, and a relative speed between the chemical liquid being fed from the chemical liquid supplier to the substrate and the substrate is substantially zero.

The substrate-treating method according to the second embodiment of this invention can be executed to have the following specific embodiments.

(1) An auxiliary plate is disposed around the substrate with the main surface of the auxiliary plate being positioned at a level approximately the same with that of the main surface of the substrate, and the chemical liquid supplier is moved from the portion of the auxiliary plate disposed on one side of the substrate to the portion of the auxiliary plate disposed on the opposite side of the substrate, thereby initiating the supply of chemical liquid starting from one side of the substrate and subsequently finishing the supply of chemical liquid at the opposite side of the substrate.

(2) A gas-ejecting port or a light-irradiating section is attached to the back surface of the chemical liquid supplier for ejecting gas or irradiating light to the main surface of the substrate immediately before feeding a chemical liquid to the main surface of the substrate, thereby modifying the main surface of the substrate.

(3) The chemical liquid feeder is moved relative to the substrate to thereby feed a first chemical liquid to the main surface of the chemical liquid supplier, and after returning the position of the chemical liquid supplier in relative to the substrate, the chemical liquid supplier is again moved relative to the substrate, thereby feeding a second chemical liquid to the main surface of the substrate through the chemical liquid-transporting face of the chemical liquid supplier while removing or moving the first chemical liquid by means of the back surface of the chemical liquid supplier.

(4) The first chemical liquid is an alkaline chemical liquid having a pH which is lower than a pH enabling to generate a reaction thereof with the substrate, and the second chemical liquid is an alkaline chemical liquid having a pH which is the same as that enables to generate a reaction thereof with the substrate.

(5) The alkaline solution having a pH enabling to generate a reaction thereof with the substrate is a buffer solution having a concentration-buffering function.

(6) The first chemical liquid is an alkaline chemical liquid having a pH which is higher than a pH enabling to generate a reaction thereof with the substrate, and the second chemical liquid is an alkaline chemical liquid having a pH which is the same as that enables to generate a reaction thereof with the substrate.

(7) The alkaline solution having a pH enabling to generate a reaction thereof with the substrate is a buffer solution having a concentration-buffering function.

(8) The step of feeding the chemical liquid to the surface of the substrate through the movement of the chemical liquid supplier from the movement-initiating position to the movement-finishing position is performed a plurality of times, and the chemical liquid existing on the surface of the substrate positioned on the advancing side of the chemical liquid supplier is pushed out by means of the back surface of the chemical liquid supplier which faces the substrate on the occasion of the second and following feeding steps of the chemical liquid, thereby removing the chemical liquid out of the substrate, during which the chemical liquid is fed from the chemical liquid-transporting face of the chemical liquid supplier to the surface of substrate disposed on a side opposite to the advancing direction of the chemical liquid supplier.

(9) The substrate-treating method further comprises a step of feeding a stop solution for terminating the treatment of the main surface of the substrate by the chemical liquid to the entire main surface of substrate from the second chemical liquid feeder which is disposed over the main surface of the substrate.

The substrate-treating device according to a third embodiment of this invention is featured in that at least one of the substrate and a chemical liquid supplier is rotated, so that a chemical liquid discharged from a chemical liquid feeder and flowing over a chemical liquid-transporting face is enabled to be fed to the main surface of the substrate in state where the feeding velocity and pressure of the chemical liquid are reduced, the relative moving speed between the substrate and the chemical liquid supplier is substantially the same with a velocity of the chemical liquid being fed from the chemical liquid supplier to the substrate, and a relative speed between the chemical liquid being fed from the chemical liquid supplier to the substrate and the substrate is substantially zero.

The substrate-treating method according to a fourth embodiment of this invention is featured in that at least one of the substrate and a chemical liquid supplier is rotated, so that a chemical liquid discharged from a chemical liquid feeder and flowing over a chemical liquid-transporting face is enabled to be fed to the entire main surface of the substrate in state where the feeding velocity and pressure of the chemical liquid are reduced, the relative moving speed between the substrate and the chemical liquid supplier is substantially the same with a velocity of the chemical liquid being fed from the chemical liquid supplier to the substrate, and a relative speed between the chemical liquid being fed from the chemical liquid supplier to the substrate and the substrate is substantially zero.

According to the substrate-treating device and/or the substrate-treating method of this invention, the chemical liquid supplier is disposed below the chemical liquid delivery port of the chemical liquid feeder, away from the chemical liquid delivery port and in such a manner that the chemical liquid-transporting face thereof is parallel or slightly inclined with the main surface of the substrate, thereby enabling the chemical liquid to be fed to the main surface of the substrate in a state where the flowing velocity and pressure of the chemical liquid are lowered before being fed to the main surface of the substrate. As a result, it is now possible to feed the chemical liquid at a very slow flow speed and a very low feeding pressure to the substrate while keeping a high concentration of the chemical liquid, thus ensuring a high working precision of the substrate.

Specifically, the chemical liquid discharged from the chemical liquid delivery port is fed to the transporting face of the chemical liquid supplier that has been disposed perpendicular to the discharging direction of the chemical liquid, thereby reducing the feeding pressure of the chemical liquid as well as decreasing the moving velocity of the chemical liquid. The chemical liquid that has been lowered in pressure and velocity is then moved over the chemical liquid-transporting face and in the direction which is approximately parallel or slightly inclined with the substrate. Further, in order to offset the moving velocity of the chemical liquid generated at this moment, the chemical liquid supplier is moved in a direction which is opposite to the flowing direction of the chemical liquid and at the same velocity as the moving velocity of the chemical liquid. Therefore, it is now possible through the feeding in this manner of the chemical liquid to the substrate to apply the chemical liquid to the surface of substrate at zero velocity (horizontal speed) and at a very low (almost zero) feeding pressure, as if the chemical liquid is softly put on the substrate, thereby forming a liquid film on the surface of substrate.

Namely, since the feeding pressure of chemical liquid to the surface of substrate can be reduced to nearly zero on the occasion of feeding the chemical liquid to the substrate, the working precision of the substrate can be improved.

Additionally, by disposing the temporary chemical liquid-holding portion for temporary holding a chemical liquid just below the chemical liquid delivery port of the chemical liquid supplier, it becomes possible, irrespective of the fluctuation of pressure of the chemical liquid being discharged from the chemical liquid delivery port, to uniformly control the transporting velocity of the chemical liquid being transported by the chemical liquid supplier. Further, due to the provision of the mechanism for moving or removing the chemical liquid on the substrate side of the chemical liquid supplier, it is now possible to uniformly feed the chemical liquid to the main surface of the substrate and at the same time, to easily replace the chemical liquid by another kind of chemical liquid.

When it is desired to perform the replacement of chemical liquid in the midway of the process, the replacement of chemical liquid can be effectively performed by setting the gap between the substrate and the transporting plate to 20 to 500 μm and by squeegee-removing, absorbing, or sucking the chemical liquid remaining on the surface of substrate by means of the back surface of the transporting plate, while concurrently allowing a fresh chemical liquid to be fed in a laminar flow from the top surface of the transporting plate.

Followings are various examples of this invention which will be explained with reference to the drawings.

EXAMPLE 1

FIGS. 1A, 1B and 1C respectively shows the schematical construction of the substrate-treating device according to the first example of this invention, wherein FIGS. 1A and 1B are drawings as viewed from the front side in the moving direction of the substrate-treating device, while FIG. 1C is a drawing as viewed laterally in the moving direction of the substrate-treating device.

Referring to these FIGS., the reference numeral 10 denotes the substrate and 20 denotes the chemical liquid feeder, the chemical liquid-transporting plate 24 being interposed between the substrate 10 and the chemical liquid feeder 20. This chemical liquid feeder 20 is composed of a chemical liquid tank 21, a chemical liquid-feeding tube 22 connected with the upper portion of the chemical liquid tank 21, and a chemical liquid delivery port 23 attached to the lower portion of the chemical liquid tank 21. In the embodiment shown in FIG. 1A, a plurality of chemical liquid delivery ports 23 are disposed orthogonally to the moving direction of the substrate-treating device, while in the embodiment shown in FIG. 1B, a chemical liquid delivery port 23' is disposed long extended orthogonally to the moving direction of the substrate-treating device.

The chemical liquid-transporting plate 24 is disposed inclined to the substrate 10 by an angle of preferably not more than 20°, more preferably in the range of 10 to 20° (80 to 70° to the discharging direction of the chemical liquid). A transporting guide 25 is attached to both ends of the chemical liquid-transporting plate 24 so as to prevent the chemical liquid from leaking from the side walls of the chemical liquid-transporting plate 24. In the following drawings, this transporting guide 25 is omitted for the convenience of explaining the configuration of the chemical liquid-transporting plate 24.

On the occasion of feeding the chemical liquid, the chemical liquid feeder 20 and the chemical liquid-transporting plate 24 are moved as shown in FIG. 2 from one side of the substrate 10, passing over the substrate 10, to the opposite side of the substrate 10, during which the chemical liquid is fed to the substrate 10. A state of feeding the chemical liquid to the substrate 10 is shown in FIG. 3. Specifically, the chemical liquid 31 is fed from the discharge port 23 to the main surface of the chemical liquid-transporting plate 24 disposed just below the discharge port 23.

When the chemical liquid-transporting plate 24 is arranged in such a manner that the main surface thereof is inclined to the discharging direction of the chemical liquid by an angle of 80 to 70°, the chemical liquid 31 being discharged is impinged approximately orthogonally against the main surface of the chemical liquid-transporting plate 24, thereby alleviating the pressure of the chemical liquid 31 being discharged and also lowering the velocity of the chemical liquid 31. Subsequently, the chemical liquid 31 is allowed to descend over the main surface of the chemical liquid-transporting plate 24 which is mildly inclined by an angle of 10 to 20°, thus reaching the main surface of the substrate 10. On this occasion, when the chemical liquid-transporting plate 24 is allowed to move in the direction opposite to the moving direction of the chemical liquid 31 at a velocity of $V\cos\theta$ ($\theta$is an angle between the transporting plate and the substrate) in relative to the moving speed V of the chemical liquid 31 at the end portion 24' of the chemical liquid-transporting plate 24, the moving speed of the chemical liquid 31 at the end portion 24' of the chemical liquid-transporting plate 24 would become approximately zero. Accordingly, the feeding pressure of the chemical liquid 31 against the main surface of the substrate 10 would become very small.

In this case, the distance between the tip end of the chemical liquid-transporting plate 24 and the substrate 10 should preferably be as small as possible in view of minimizing the pressure by the chemical liquid. Specifically, the distance should preferably be in the range of several hundreds micrometers to 1 millimeter, more preferably in the range of 100 to 700 μm. Further, the tip end of the chemical liquid-transporting plate 24 should desirably be made sharp or slightly rounded. In the embodiments shown in FIGS. 1A to 3, the tip end of the chemical liquid-transporting plate 24 is slightly rounded. On the other hand, in the embodiments shown in FIGS. 6A to 6D, FIGS. 7A to 7D, FIGS. 8A and 8B, and FIGS. 9A to 9G to be explained hereinafter, the tip end of the chemical liquid-transporting plate 24 is made sharp. When the tip end of the chemical liquid-transporting plate 24 is of a configuration having a right angle edge without being constructed in the aforementioned manner, a pulsating flow would be generated due to the surface tension of liquid at this tip end portion, thereby deteriorating the working precision.

If there is a moving speed of chemical liquid on the surface of the substrate, the chemical liquid is caused to move over the surface of the substrate while being reacted with a material to be treated (such as a resist). Therefore, the chemical liquid containing a reaction product is always supplied to the downstream side in the movement of the chemical liquid, thereby delaying the reaction speed and hence, deteriorating the uniformity of working. In the embodiments shown in FIGS. 6A to 6D, the moving speed of the chemical liquid delivery port which makes zero the moving speed of the chemical liquid over the substrate approximately can be determined univocally by the feeding quantity of chemical liquid and a desired liquid thickness, thus indicating a relationship as shown in FIG. 4A. Further, the angle of the chemical liquid-transporting plate on this occasion can be represented as shown in FIG. 4B.

Figure 4B:
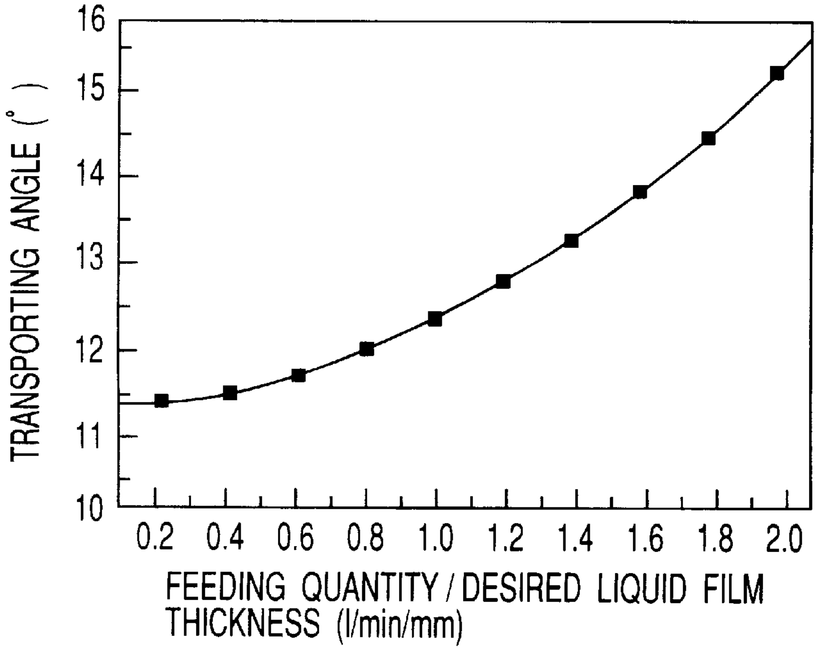

Namely, the relationship shown in FIG. 4B illustrates a case where a quartz which is polished to have a surface roughness of several micrometers is employed, though the values may be varied depending on the material and worked condition of the main surface of the transporting plate. As for the liquid thickness, it should preferably be in the range of about 0.8 to 2.4 mm, more preferably in the range of 1 mm to 2 mm.

Figure 5A:
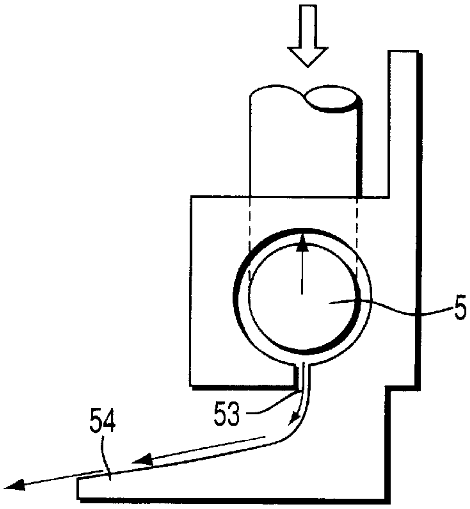
FIGS. 5A, 5B and 5C respectively shows a schematic view illustrating the fact that the velocity of chemical liquid can be made slower by making use of the chemical liquid-transporting plate of the example of this invention as compared with an example according to the prior art.
Figure 5B:
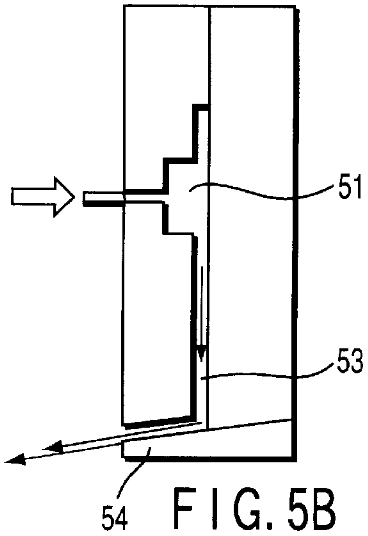

Next, the fact that the moving speed of chemical liquid can be delayed by making use of the chemical liquid-transporting plate according to this example will be explained in comparison with the examples according to the prior art. FIGS. 5A and 5B illustrate examples of device according to the prior art, and FIG. 5C illustrates an example of device according to this example.

In the case of the device shown in FIG. 5A, a chemical liquid delivery port 53 is continuous with a chemical liquid-transporting portion 54 having a curved surface of continuous curvature (Japanese Patent Unexamined Publication H10-223507). Accordingly, the chemical liquid that has been discharged from the chemical liquid delivery port 53 is of high pressure. Further, since a gravity is added to this high pressure, the moving speed of the chemical liquid would be accelerated.

In the case of the device shown in FIG. 5B, the chemical liquid-transporting portion 54 connected with the chemical liquid delivery port 53 is made into a closed space (Japanese Patent Unexamined Publication H7-36195). Therefore, it is impossible to slow the moving speed of the chemical liquid by simply changing the direction of movement. In this FIG. 5B, the length of the arrow represents the extent of the moving speed of the chemical liquid.

Figure 5C:
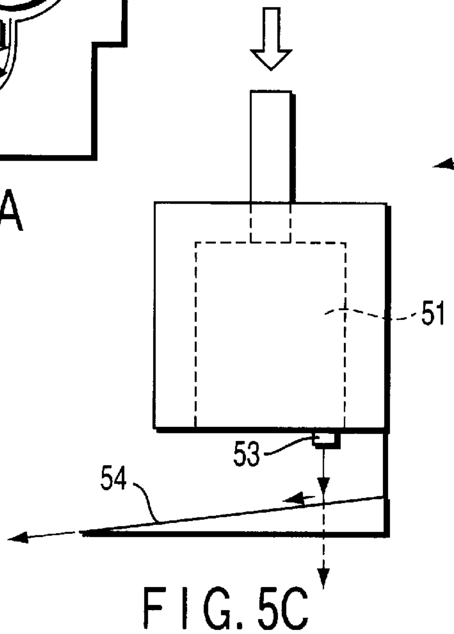

Whereas, if the chemical liquid delivery port 53 is isolated from the chemical liquid-transporting portion 54 as in the case of the device shown in FIG. 5C according to this example, the chemical liquid is allowed to flow in an open space, so that the moving speed of the chemical liquid along the transporting plate becomes smaller as shown by an arrow of a solid line though the speed of the chemical liquid in the vertical direction may be large as shown by an arrow of a broken line.

In the device according to this example, a chemical liquid-transporting plate formed of a quartz plate having a sharpened tip end 10° in angle was employed, and the surface of the DUV resist film formed on the main surface of the substrate that had been subjected to a DUV exposure (248 nm)/baking treatment was moved under the conditions of 2 L/min. in feeding quantity of chemical liquid and 85 mm/sec. in moving speed, thereby forming a liquid film. The thickness of the liquid film on this occasion was 2.05 mm. Following a development treatment of 90 seconds, the liquid film was replaced by a pure water and spin-dried to form a resist pattern having a line width of 150 nm. The dimensional uniformity of the line portion of this 150 nm line-and-space pattern thus formed was enabled to be confined to $3\sigma<5$ nm in the portion inside the 8-inch wafer.

By the way, according to the conventional method wherein a chemical liquid was fed under a high pressure and turbulent flow, the dimensional uniformity was $3\sigma=10$ nm or so, thus indicating that it was possible, according to the method of this example, to reduce the working uniformity to a half. By the way, the structure of the film formed on the substrate was such that a film having an anti-reflection property to a DUV exposure was formed at first on a flattened insulating film and then, a DUV resist film was formed on the anti-reflection film.

According to this example, the conditions for development were determined so as to obtain a film thickness of 2.05 mm. However, this invention is not limited to this film thickness. Namely, it is possible to form a liquid film having any desired film thickness by adjusting the quantity of feeding a chemical liquid and the moving speed of the chemical liquid delivery port by making use of the relationships shown in FIGS. 4A and 4B.

Figure 6A:
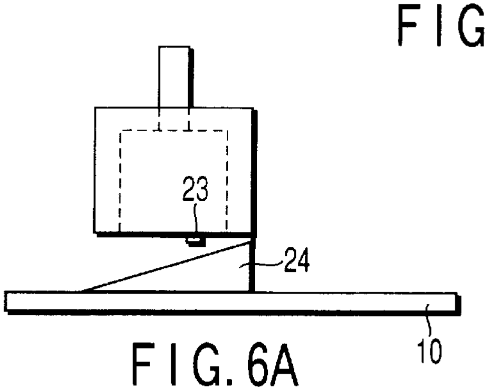
FIGS. 6A to 6D show various embodiments of the chemical liquid-transporting plate according to this invention.
Figure 6B:
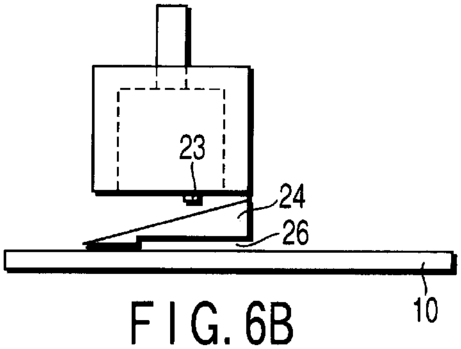
Figure 6C:
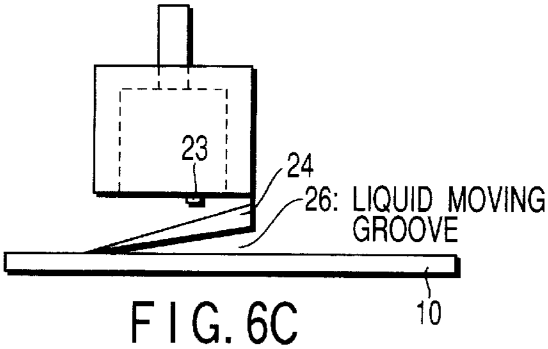
Figure 6D:
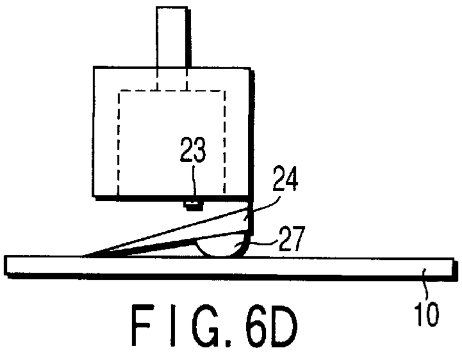

As for the construction of the chemical liquid-transporting plate, it is possible to modify it variously. FIG. 6A shows the aforementioned construction; FIG. 6B shows a construction wherein a chemical liquid-moving groove 26 is formed on the upstream side (bottom side) in the moving direction of the chemical liquid-transporting plate 24; FIG. 6C shows a construction wherein the upstream side of the bottom surface of the chemical liquid-transporting plate 24 is slightly raised, resulting in the formation of a chemical liquid-moving groove; and FIG. 6D shows a construction wherein a chemical liquid-absorbing portion 27 is further formed on the bottom of the chemical liquid-transporting plate 24 in addition to the structure shown in FIG. 6C. This chemical liquid-absorbing portion 27 may be formed of a sponge-like member, or a vacuum means connected to, for example a vacuum pump.

Incidentally, the chemical liquid-removing functions shown in FIGS. 6A to 6D can be added to any nozzles for feeding a chemical liquid to the substrate.

The constructions shown in FIGS. 7A to 7D illustrate constructions wherein a chemical liquid trap 28 is formed on the upper surface of the chemical liquid-transporting plate 24 in addition to the structures shown in FIGS. 6A to 6D.

In the case of the constructions shown in FIGS. 6B, 6C, 7B and 7C, the back surface (the bottom side: the surface facing the substrate 10) of the chemical liquid-transporting plate 24 is designed such that the chemical liquid fed to surface of the substrate 10 is pushingly moved or removed. FIG. 8A illustrates a manner of feeding a second chemical liquid 32 on the surface of the substrate 10 from the main surface of the chemical liquid-transporting plate 24 while pushingly removing a first chemical liquid 31 by making use of the back surface of the chemical liquid-transporting plate 24.

The constructions shown in FIGS. 6D and 7D are provided with means for allowing a chemical liquid to be absorbed by the back surface of the chemical liquid-transporting plate 24. FIG. 8B illustrates a manner of feeding a second chemical liquid 32 on the surface of the substrate 10 from the main surface of the chemical liquid-transporting plate 24 while absorbingly removing a first chemical liquid 31 by making use of the constructions shown in FIGS. 6D and 7D.

The exchange of chemical liquid in the constructions shown in FIGS. 8A and 8B includes the following processes.

(1) A process for feeding a developing solution (a second chemical liquid) after feeding a pure water (a first chemical liquid) to the surface of the substrate 10 for the purpose of the surface modification.

(2) A process for feeding a development-stopping solution (a second chemical liquid) after finishing a development treatment by feeding a developing solution (a first chemical liquid) to the surface of the substrate 10.

(3) A process for feeding a fresh developing solution (a first chemical liquid) after finishing a development treatment by feeding a developing solution (a first chemical liquid) to the surface of the substrate 10.

These processes can be applied to a wet etching process. In such cases, the expression of "development" in the aforementioned processes should be replaced by the expression of "etching". Further, it is also possible to perform only the removal of the chemical liquid by making use of the back surface of the chemical liquid-transporting plate 24, or to perform only the replenishment of the chemical liquid by making use of the main surface of the chemical liquid-transporting plate 24.

According to the prior art, a pure water has been often employed as a surface modifying liquid. In the development system as employed in this example however, the exchange of chemical liquid may not be sufficiently performed. Therefore, it may be advisable to employ an alkaline or acid solution having a concentration which would not bring about a reaction in the surface-modifying liquid. When such a chemical liquid is employed, it is possible to quickly shift the process to the chemical liquid treatment step.

When a developing solution having a pH of about 13.8 is to be employed as a first chemical liquid as in this example, it is advisable to employ a liquid having a pH of about 12–13 as a concentration of the surface modifying liquid. It is also advisable to employ a developing solution having a buffering effect as a first chemical liquid (a developing solution). When a developing solution having a buffering effect is employed, a surface modifying liquid may be left remain immediately after the feeding of the developing solution, so that even if the state of treatment liquid is of low concentration, the recovery in concentration of the treatment liquid can be brought about due to the buffering effect of the chemical liquid being fed, thereby dissipating a difference of concentration that has been caused due to a residual surface modifying liquid.

As for the developing solution having a buffering effect, a solution of TMAH containing a little quantity of a salt to be derived from the TMAH and a weak acid. By the way, when an acid (such as hydrofluoric acid) is employed as a first chemical liquid also, it is advisable to employ, as a surface modifying liquid, an acid having a larger pH value than that of the treatment liquid and also having a buffering property (for example, a mixed solution comprising hydrofluoric acid and ammonium fluoride).

Even if the chemical liquid-transporting plate 24 which has a sharp tip end is employed as seen in the constructions shown in FIGS. 6A to 6D and FIGS. 7A to 7D, there will be generated a phenomenon wherein a chemical liquid is caused to swell at the distal end thereof due to the surface tension thereof if the substrate is not existed just below the chemical liquid-transporting plate 24 especially if the feeding quantity of the chemical liquid is relatively small. Accordingly, if the chemical liquid is fed to the substrate 10 under such a condition, a turbulence would be generated in the chemical liquid that has been fed to the substrate 10 immediately after the feeding of the chemical liquid to the substrate 10 that has been introduced just below the chemical liquid-transporting plate 24. In order to prevent this phenomenon, it may be advisable as a matter of fact to dispose an auxiliary plate 11 around the substrate 10 as shown in FIG. 2 explained above and in FIGS. 9A to 9G to be explained hereinafter. In this case, the main surface of the auxiliary plate 11 should preferably be provided with the same degree of interfacial tension against the chemical liquid as that of the main surface of the substrate 10. On the other hand, the interfacial tension of the transporting plate should preferably be smaller than those of the auxiliary plate and substrate.

Figure 9A:
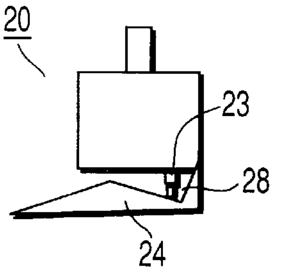
FIGS. 9A to 9G illustrate the relationship between the substrate-treating process and wafer for feeding a chemical liquid and an auxiliary plate.
Figure 9E:
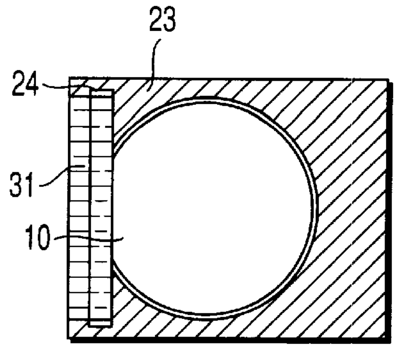
Figure 9B:
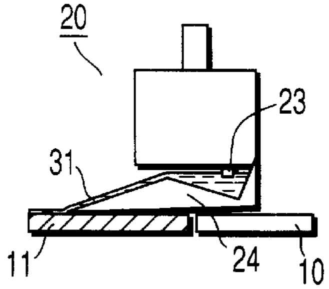
Figure 9F:
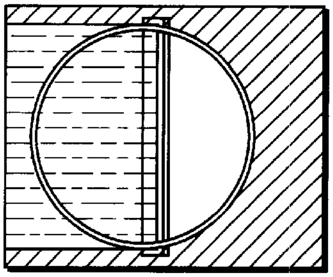
Figure 9C:
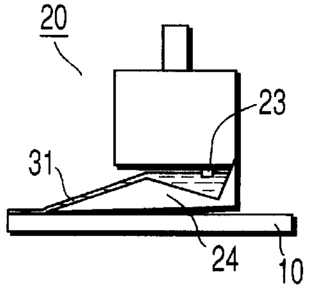
Figure 9G:
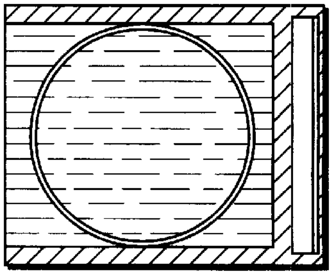
Figure 9D:
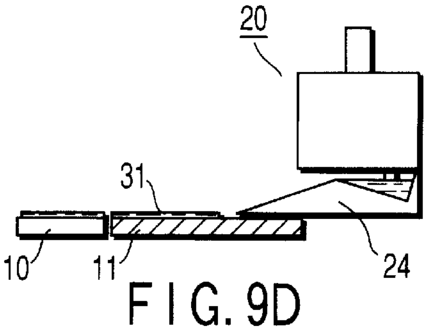

By the way, FIGS. 9A, 9B, 9C and 9D are side views, while FIGS. 9E, 9F and 9G are top plan views, corresponding respectively with FIGS. 9B, 9C and 9D.

The auxiliary plate 11 is disposed to surround the substrate 10 in such a manner that the main surface thereof is almost flush with the main surface of the substrate 10. In FIG. 9E, the chemical liquid feeder 20 and the chemical liquid-transporting plate 24 are allowed to shift from left to right (in the drawings) over the auxiliary plate 11, during which the chemical liquid is fed to the auxiliary plate 11 and the substrate 10.

First of all, when the chemical liquid feeder 20 and the chemical liquid-transporting plate 24 are placed over the auxiliary plate 11 which is disposed on the left side of the substrate 10, the feeding of chemical liquid is initiated (FIG. 9A). The main surface of the chemical liquid-transporting plate 24 employed herein is provided with a chemical liquid trap (a chemical liquid-holding portion) 28, so that this chemical liquid trap 28 is fill with the chemical liquid 31 at first, and a portion of the chemical liquid 31 that has been overflowed from the chemical liquid trap 28 is allowed to flow along the main surface of the chemical liquid-transporting plate 24, thus feeding the chemical liquid 31 to the surface of the auxiliary plate 11 (FIGS. 9B and 9E). At the moment when the flow of the chemical liquid 31 on the auxiliary plate 11 is well-ordered, the shift or movement of the chemical liquid-transporting plate 24 (and the chemical liquid feeder 20) is initiated. Passing over the substrate 10 (FIGS. 9C and 9F, the chemical liquid-transporting plate 24 is moved at least over the auxiliary plate 11 which is disposed on the right side of the substrate 10.

At the moment when the left edge (a chemical liquid-feeding point) of the chemical liquid-transporting plate 24 has moved through the surface of the substrate 10 to the auxiliary plate 11, the discharging of the chemical liquid 31 is suspended and at the same time, the moving of the chemical liquid-transporting plate 24 is also suspended (FIGS. 9D and 9G). The distance between the auxiliary plate 11 as well as the substrate 10 and the chemical liquid-transporting plate 24 should preferably be not larger than 1 mm. It is also preferable that the wettability of the auxiliary plate 11 to the chemical liquid 31 is almost the same as the wettability of the substrate 10 to the chemical liquid 31. The gap between the substrate 10 and the auxiliary plate 11 may be such a degree that is effective to prevent the chemical liquid 31 from being spilled through the gap. After finishing the feeding of the chemical liquid 31 to the substrate 10, the auxiliary plate 11 may be kept in a state of standby at a position over or below the substrate 10.

EXAMPLE 2

This example relates to a wet etching method which makes use of a chemical liquid-transporting plate having a construction shown in FIG. 7 and a solution of ammonium cerium (II) nitrate. A synthetic quartz was employed for the preparation of the chemical liquid-transporting plate 24, and the angle of the tip end of the chemical liquid-transporting plate 24 was set to 11°. Further, the angle between the main surface of the chemical liquid-transporting plate 24 and an exposure mask blank for the substrate 10 was set to 12.3°. The main surface of the mask blank has a Cr film on which a resist pattern was formed.

Figure 10A:
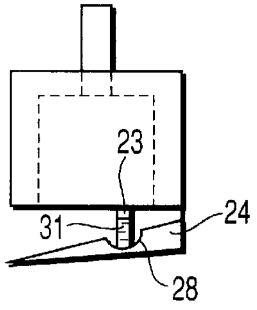
FIGS. 10A to 10D illustrate the process of wet etching according to a second example.
Figure 10B:
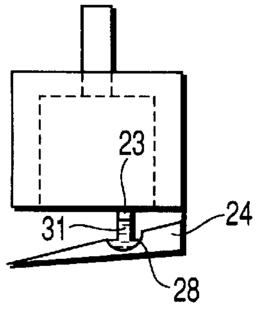
Figure 10C:
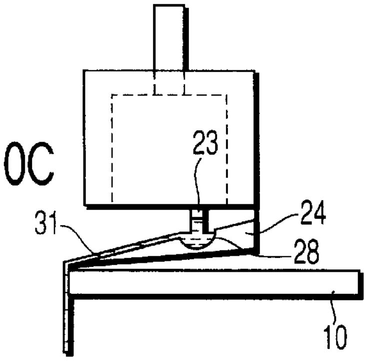
Figure 10D:
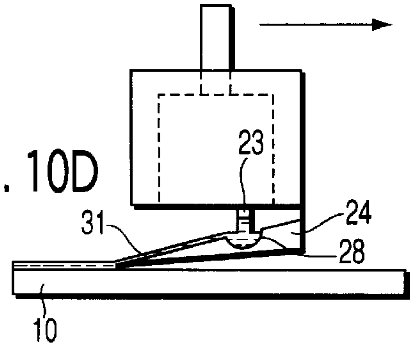

First of all, as shown in FIG. 10A, at the location outside the mask blank for the substrate 10, the feeding of the chemical liquid 31 to the chemical liquid trap 28 of the chemical liquid-transporting plate 24 was initiated from the chemical liquid delivery port 23. As a result, the chemical liquid trap 28 was gradually filled with the chemical liquid 31 as shown in FIG. 10B. Thereafter, the chemical liquid 31 begun to overflow from the chemical liquid trap 28, thus allowing it to run along the main surface of the chemical liquid-transporting plate 24.

At the moment when the flow of the chemical liquid 31 on the main surface of the chemical liquid-transporting plate 24 was well-ordered, the chemical liquid-transporting plate 24 was moved in the direction shown by the arrow at a velocity of 83 mm/sec. thereby feeding a solution of ammonium cerium (II) nitrate as a chemical liquid (etching liquid) to the main surface of the blank. After the treatment of the blank for 60 seconds, the chemical liquid-transporting plate 24 was allowed to move in the direction shown by the arrow, which was the same as the feeding direction of the etching liquid as shown in FIGS. 8A and 8B, during which water was fed from the main surface of the chemical liquid-transporting plate 24 while removing the etching liquid by making use of the back surface of the chemical liquid-transporting plate 24, thereby suspending the etching.

Further, a pure water was fed entirely to the surface of the substrate from a single nozzle which was disposed over the central portion of the substrate, thereby washing the surface of the substrate. Subsequently, the surface of the substrate was dried to remove the water. By the way, a rectangular substrate is to be treated as in this example, it is possible to employ non-pattern region of the rectangular substrate in place of the aforementioned auxiliary plate.

By feeding an etching liquid as performed in this example, the working precision could be prominently improved, thus making it possible to form a pattern with a dimensional precision of $3\sigma<7$ nm. Since the dimensional precision of pattern to be obtained according to the conventional process is: $3\sigma=15$ nm, it will be understood that the working of exposure mask blank as performed in this example is effective in prominently improving the working precision. Further, with respect to semiconductor device such as SRAM, DRAM, logic, etc. that have been fabricated by making use of the exposure blank prepared in this manner, it was possible to improve the non-uniformity of electric properties, thus making it possible to further miniaturize a semiconductor chip.

Although the chemical liquid 31 was fed to the substrate 10 while feeding the chemical liquid 31 from the chemical liquid delivery port 23 onto the chemical liquid trap 28 that has been formed on the main surface of the chemical liquid-transporting plate 24, there is not any particular limitation regarding the feeding method of the chemical liquid. Further, the chemical liquid 31 can be fed to the main surface of the substrate 10 by a method shown in FIGS. 11A to 11E, wherein the chemical liquid 31 that has been fed from the chemical liquid delivery port 23 is once stored in the chemical liquid trap 28 (FIG. 11A→FIG. 11B), the delivery of the chemical liquid 31 is suspended (FIG. 11C), and the chemical liquid 31 is caused to overflow little by little from the chemical liquid trap 28 while moving the chemical liquid-transporting plate 24, thus allowing the chemical liquid 31 to run along the chemical liquid-transporting plate 24 and feeding the chemical liquid 31 to the main surface of the substrate 10.

In this example, any structure can be employed as far as it has the chemical liquid trap and the chemical liquid-transporting plate for effecting a flow control, and can supply the chemical liquid on the main surface of the substrate at a low pressure. Where the chemical liquid delivery port is opposed to the chemical liquid-transporting plate, and two flows joins at the supplying portion to the substrate, the chemical liquid can be supplied on the substrate at a lower flow speed.

Figure 11A:
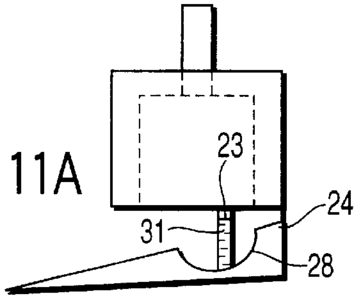
FIGS. 11A to 11E illustrate a modified example of chemical liquid-feeding system.
Figure 11B:
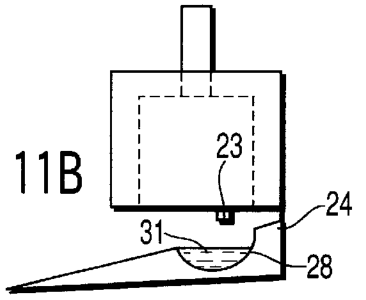
Figure 11C:
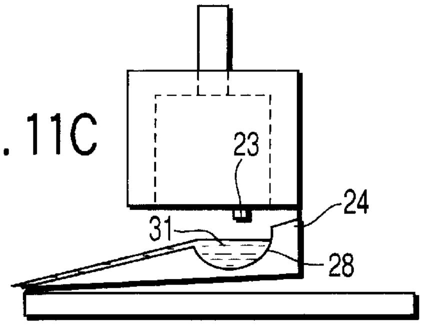
Figure 11D:
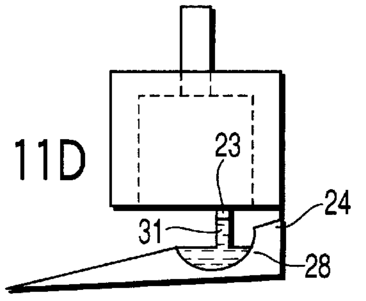
Figure 11E:
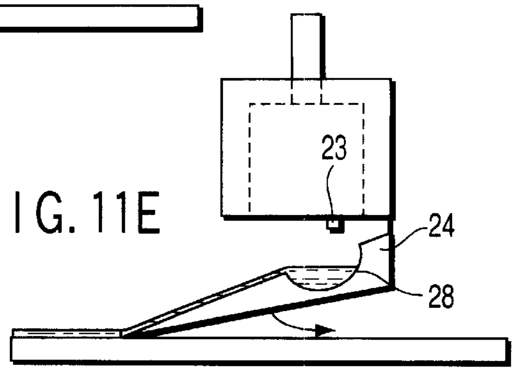
Figure 12A:
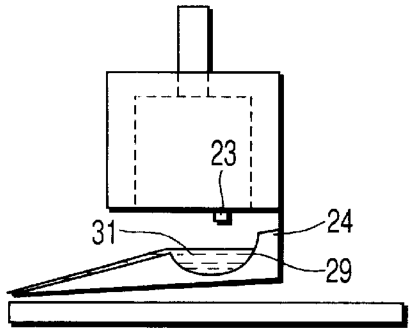
FIGS. 12A and 12B illustrate a modified example of chemical liquid-feeding system.
Figure 12B:
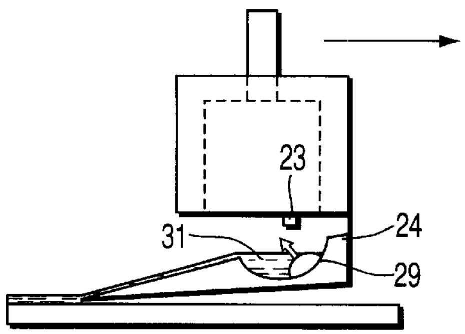

As one of the methods for allowing the chemical liquid 31 to overflow, the inclination of the chemical liquid-transporting plate 24 may be gradually increased (FIG. 11D). In this case, the chemical liquid feeder is moved in the direction of the arrow while entirely raising upward the chemical liquid feeder so as not to cause the chemical liquid-transporting plate 24 to be impinged against the substrate 10 (FIG. 11E). As shown in FIGS. 12A and 12B further, it is also possible to employ a method wherein a chemical liquid-discharging mechanism 29 is attached to a portion of the chemical liquid trap 28, and the chemical liquid feeder is entirely moved in the direction of the arrow, thereby allowing the chemical liquid 31 to overflow.

This chemical liquid-discharging mechanism 29 can be constructed in the following manner.

(1) An expandable tube like balloon is disposed in the chemical liquid trap, and then, air is introduced into the expandable tube so as to expand the tube, thereby enabling the capacity of the chemical liquid trap to be substantially minimized, thus causing the chemical liquid to overflow therefrom.

(2) A portion of the chemical liquid trap is made movable back and forth in the feeding direction of the chemical liquid (or in the direction of up and down), thereby enabling the capacity of the chemical liquid trap to be substantially minimized, thus causing the chemical liquid to overflow therefrom.

(3) The chemical liquid trap is provided with a discharge means (a block) which is designed to be inserted into the chemical liquid trap, thereby enabling the capacity of the chemical liquid trap to be substantially minimized, thus causing the chemical liquid to overflow therefrom.

In addition to the aforementioned methods (1) to (3), any other method can be employed as far as it is capable of changing the capacity of the chemical liquid trap so as to cause the chemical liquid to overflow therefrom.

As far as the procedures up to the step of filling the chemical liquid trap 28 with a chemical liquid are concerned, the embodiment shown in FIGS. 12A and 12B is the same as that shown in FIGS. 11A to 11C. Thereafter, the chemical liquid-discharging mechanism 29 installed in advance inside the chemical liquid trap 28 is gradually expanded so as to initiate the feeding of the chemical liquid 31 to the substrate 10.

According to this system, the discharging of the chemical liquid 31 from the chemical liquid delivery port 23 is once suspended and left to stand, thereby making it possible to eliminate a ripple generated from the discharging of the chemical liquid 31. When the chemical liquid 31 is fed to the substrate 10 at this moment, a uniform liquid film can be formed.

Figure 13A:
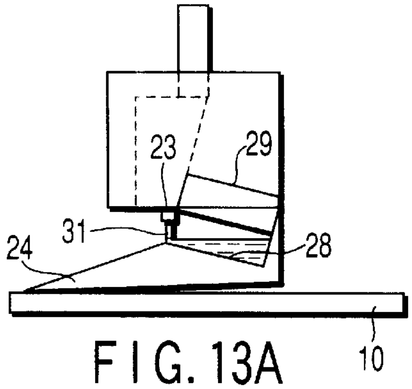
FIGS. 13A to 13C illustrate a modified example of chemical liquid-feeding system.
Figure 13B:
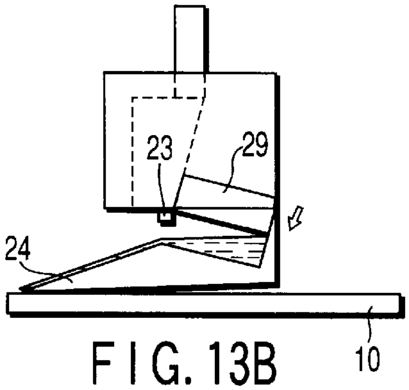
Figure 13C:
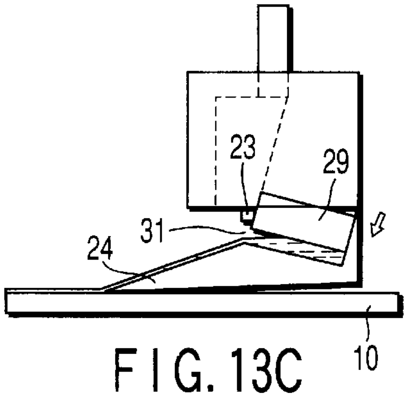

Likewise, in the embodiment shown in FIGS. 13A to 13C, the chemical liquid 31 is fed to the chemical liquid trap 28 (FIG. 13A), and the discharging of the chemical liquid 31 from the chemical liquid delivery port 23 is once suspended. Then, the chemical liquid-discharging mechanism 29 is inserted in the direction of the arrow into the chemical liquid trap 28, thereby causing the chemical liquid 31 to overflow from the chemical liquid trap 28, thus initiating the feeding of chemical liquid to the surface of the substrate 10 (FIG. 13B). In this case, the chemical liquid-discharging mechanism 29 should desirably be completely dipped into the chemical liquid trap 28 so as to make uniform the quantity per unit time of the chemical liquid 31 that has been overflowed from the chemical liquid trap 28 (FIG. 13C).

Figure 14A:
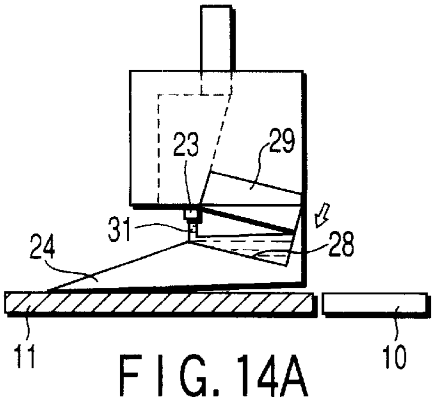

By the way, according to the embodiments shown in FIGS. 12A, 12B, 13A to 13C, the chemical liquid delivery port 20 and the chemical liquid-transporting plate 24 are concurrently moved. However, only the chemical liquid-transporting plate 24 may be moved as shown in FIGS. 14A to 14D. Namely, first of all, as shown in FIG. 14A, the chemical liquid feeder 20 is disposed over the auxiliary plate 11, and the chemical liquid-transporting plate 24 is allowed to move between the chemical liquid feeder 20 and the auxiliary plate 11, thereby allowing the chemical liquid 31 to be fed from the chemical liquid feeder 20 to the chemical liquid trap 28 of the chemical liquid-transporting plate 24.

Figure 14B:
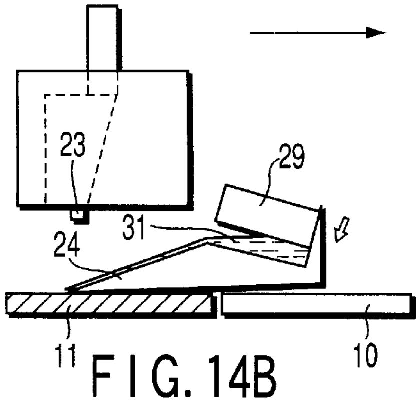
Figure 17A:
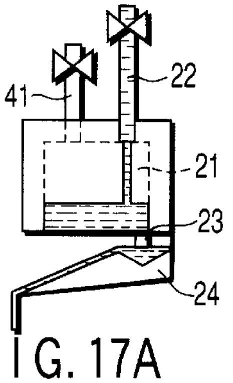
FIGS. 17A to 17F illustrate another example of the process of treating a substrate by making use of devices shown in FIGS. 15A and 15B.
Figure 17B:
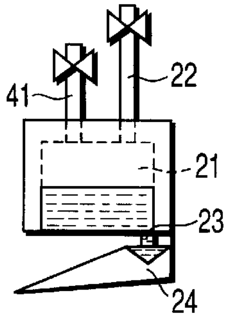
Figure 17C:
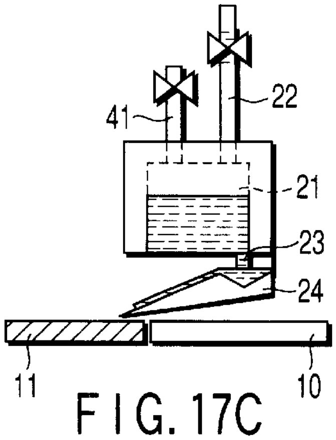
Figure 17D:
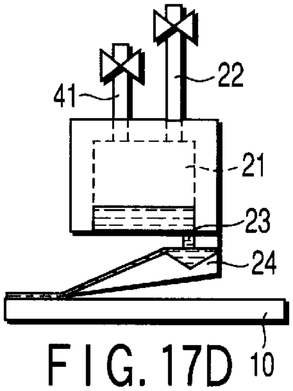
Figure 17E:
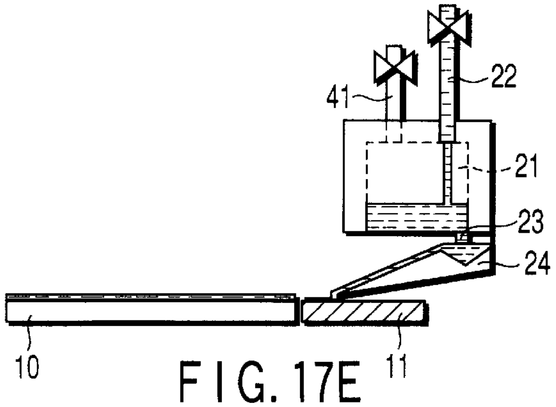
Figure 17F:
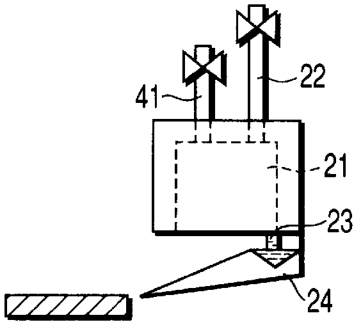

Then, as shown in FIG. 14B, the chemical liquid-discharging mechanism 29 is actuated to cause the chemical liquid 31 to overflow from the chemical liquid trap 28. Then, at the moment when the flow of the chemical liquid 31 on the main surface of the auxiliary plate 11 has been well-ordered, the chemical liquid-transporting plate 24 is initiated to move in the direction shown by the arrow. Thereafter, as shown in FIG. 14C, the chemical liquid 31 is fed to the main surface of the substrate 10, and then as shown in FIG. 14D, the feeding of the chemical liquid 31 is suspended (the operation of the chemical liquid-discharging means is suspended) when the chemical liquid-transporting plate 24 is moved over the place where another auxiliary plate 11 of the opposite side is located, and at the same time, the movement of the chemical liquid-transporting plate 24 is stopped.

EXAMPLE 3

This example relates to a method of feeding a chemical liquid at a low pressure. As a chemical liquid feeder to be employed in this example, an open tube 41 and a valve for allowing the chemical liquid tank 21 to communicate with air atmosphere are attached to the chemical liquid tank 21. The procedures using this chemical liquid feeder 20 are illustrated in FIGS. 16A to 16F.

First of all, at the location outside the substrate 10, the feeding of the chemical liquid to the chemical liquid tank 21 through the chemical liquid-introducing tube 22 is initiated. On this occasion, a little quantity of the chemical liquid 31 is leaked also from the chemical liquid delivery port 23 (FIG. 16A). At the moment when the chemical liquid tank 21 is filled with a sufficient quantity of the chemical liquid 31, which corresponds to a total of a quantity of the chemical liquid to be fed to the surface of the substrate 10 and a quantity of the chemical liquid that will be consumed before and after the aforementioned feeding of the chemical liquid, the valve of the chemical liquid-introducing tube 22 is closed (FIG. 16B). Once this valve is closed, the interior of the chemical liquid tank 21 becomes a negative pressure, so that the chemical liquid 31 cannot be discharged from the chemical liquid delivery port 23.

Then, the chemical liquid feeder 20 and the chemical liquid-transporting plate 24 are moved close to the auxiliary plate 11, and the releasing valve 41 is opened (FIG. 16C). Due to a predetermined pressure applied to the chemical liquid tank 21, a predetermined quantity of chemical liquid in proportion to the aforementioned predetermined pressure is fed from the chemical liquid delivery port 23 to the chemical liquid-transporting plate 24. When the flow of the chemical liquid 31 becomes constant on the surface of the auxiliary plate 11, the chemical liquid feeder 20 and the chemical liquid-transporting plate 24 are moved over the substrate 10, thereby forming a liquid film on the surface of the substrate 10 (FIG. 16D).

Upon finishing the supply of the chemical liquid over the substrate 10, the chemical liquid feeder 20 is moved outside the substrate 10 (FIG. 16E). Thereafter, the chemical liquid 31 placed on the chemical liquid-transporting plate 24 is discharged (FIG. 16F). By the way, at the step shown in FIG. 16E, the chemical liquid 31 is completely discharged from the chemical liquid tank 21. However, a little quantity of chemical liquid may be left in the chemical liquid tank 21.

In this example, the pressure against the surface of the chemical liquid in the chemical liquid tank 21 is designed to be adjusted according to the opening degree of the valve of the releasing tube 41, so that the chemical liquid 31 can be fed to the substrate 10 at a lower pressure as compared with that of the aforementioned first example. Accordingly, the moving speed of the chemical liquid feeder 20 can be delayed and hence, the relative moving speed between the substrate 10 and the chemical liquid 31 could be reduced to nearly zero. Additionally, the dimensional uniformity of the line portion of the 130 nm line-and-space pattern formed in this example was enabled to be confined to $3\sigma<4$ nm in the portion inside the 8-inch wafer.

In this example, although the main surface of the chemical liquid-transporting plate 24 was flattened, this invention is not confined to this configuration, i.e. a structure having the chemical liquid trap 28 on the main surface thereof as shown in FIGS. 17A to 17F may be employed. It is possible with this structure to inhibit the turbulent flow of the chemical liquid, and at the same time, to minimize the effect of gravity.

Figure 18A:
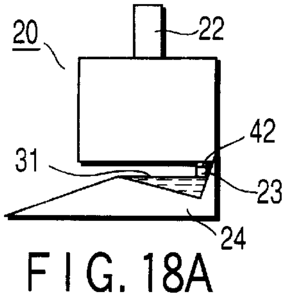
FIGS. 18A and 18B respectively shows the chemical liquid feeder employed in FIGS. 17A to 17F and the construction provided with the function of washing the chemical liquid-transporting plate.
Figure 18B:
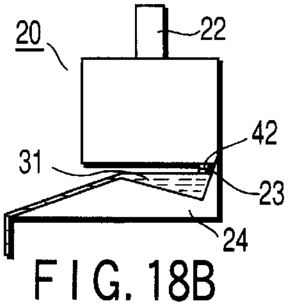

FIGS. 18A and 18B respectively shows a construction which is provided with a washing function for the chemical liquid feeder 20 and the chemical liquid-transporting plate 24 shown in FIGS. 17A to 17F.

The chemical liquid feeder 20 is provided, in addition to the chemical liquid delivering port 23, with a discharge port 42 for a washing chemical liquid (this chemical liquid may be pure water). This chemical liquid delivering port 23 is disposed in such a manner that it can be completely dipped in the chemical liquid 31 when the chemical liquid trap 28 is filled with the chemical liquid 31. Whereas, the discharge port 42 for a washing chemical liquid is disposed so as not to be dipped in the chemical liquid 31 in the chemical liquid trap 28. On the occasion of washing, the washing chemical liquid or washing solution is fed into the chemical liquid trap 28 from the discharge port 42. When washing is performed in this manner, the main surfaces of the chemical liquid trap 28 and chemical liquid-transporting plate 24 can be effectively washed.

EXAMPLE 4

Figure 19A:
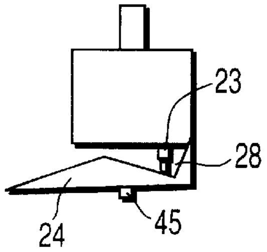
FIGS. 19A to 19G illustrate the process of treating a substrate according to Example 4.

This example relates to a method for performing a surface modification by blowing gas against the main surface of substrate immediately before feeding a chemical liquid to the main surface of substrate. In this case, the substrate-treating device is constructed such that in addition to the structure shown in FIGS. 9A to 9G, a gas blow-out port 45 is attached to the back side (a surface facing the substrate) of the chemical liquid-transporting plate 24 as shown in FIG. 19A. Namely, steam for instance is enabled to be blown out from this gas blow-out port 45. The structural elements other than this gas blow-out port 45 as well as the operation thereof are the same as those shown in FIGS. 9A to 9G.

In this apparatus, a chemical liquid-transporting plate formed of a quartz plate having a sharpened tip end 10° in angle was employed. In this case, a chemical liquid was fed to the surface of the DUV resist film formed on the main surface of the substrate that had been subjected to a DUV exposure (248 nm)/baking treatment, while concurrently moving the chemical liquid feeder 20 and the chemical liquid-transporting plate 24 at a speed of 85 mm/sec. with the chemical liquid trap 28 being fixed relative to the chemical liquid feeder 20. Further, steam is allowed to eject from the gas blow-out port 45 attached to the back surface of the chemical liquid-transporting plate 24, thereby modifying the main surface of the substrate 10 into a hydrophilic surface before feeding the chemical liquid.

Figure 19E:
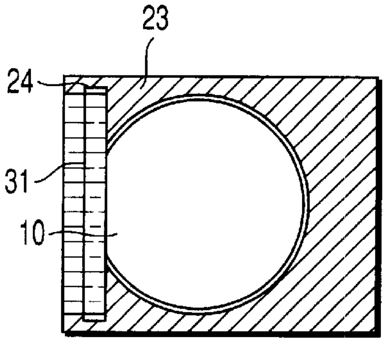
Figure 19B:
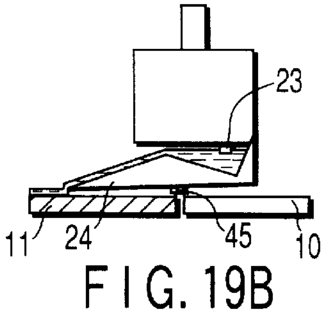

The timing of feeding the chemical liquid, and the scanning of the chemical liquid feeder 20 and chemical liquid-transporting plate 24 may be the same. Namely, when the chemical liquid feeder 20 and the chemical liquid-transporting plate 24 are placed over the auxiliary plate 11 which is disposed on the left side of the substrate 10, the feeding of chemical liquid is initiated, and a portion of the chemical liquid 31 that has been overflowed from the chemical liquid trap 28 is allowed to run along the main surface of the chemical liquid-transporting plate 24, thus feeding the chemical liquid 31 to the surface of the auxiliary plate 11 (FIGS. 19B and 19E).

Figure 19F:
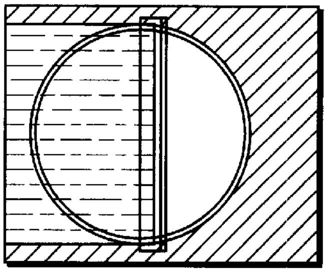
Figure 19C:
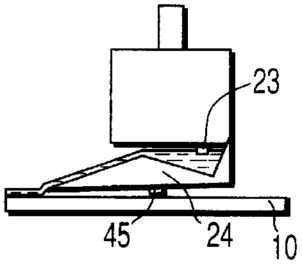
Figure 19G:
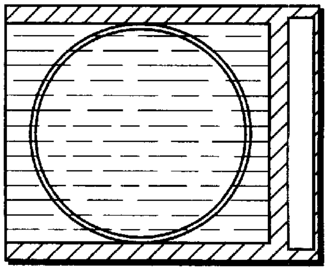
Figure 19D:
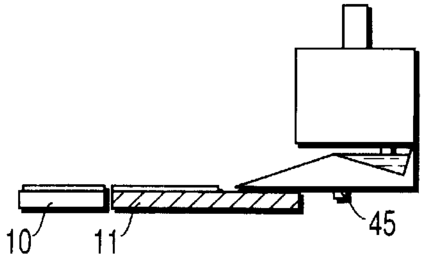

At the moment when the flow of the chemical liquid 31 on the auxiliary plate 11 is well-ordered, the shift or movement of the chemical liquid-transporting plate 24 (and the chemical liquid feeder 20) is initiated, thus allowing it to pass over the substrate 10 (FIGS. 19C and 19F). At the moment when the left edge (a chemical liquid-feeding point) of the chemical liquid-transporting plate 24 has moved through the surface of the substrate 10 to the auxiliary plate 11, the discharging of the chemical liquid 31 is suspended and at the same time, the moving of the chemical liquid-transporting plate 24 is also suspended (FIGS. 19D and 19G).

The chemical liquid was fed to the main surface of the substrate 10 from the main (upper) surface of the chemical liquid-transporting plate 24 at a flow rate of 2 L/min., while modifying the surface of the substrate 10 into a hydrophilic surface by making use of the back surface of the chemical liquid-transporting plate 24 as explained above, thereby forming a liquid film on the substrate 10. The thickness of the liquid film was 2.05 mm. After finishing the developing treatment of 90 seconds, the liquid film was substituted by pure water and then, spin-dried, thus forming a resist pattern having a line width of 150 nm. The dimensional uniformity of the line portion of the 150 nm line-and-space pattern formed in this example was enabled to be confined to $3\sigma<5$ nm in the portion inside the 8-inch wafer.

By the way, according to the conventional method wherein a chemical liquid was fed under a high pressure and turbulent flow, the dimensional uniformity was $3\sigma=10$ nm or so, thus indicating that it was possible, according to the method of this example, to reduce the working uniformity to a half. By the way, the composition of the film formed on the substrate 10 was such that a film having an anti-reflection property to a DUV exposure was formed at first on a flattened film and then, a DUV resist film was formed on the anti-reflection film.

According to this example, the conditions for development were determined so as to obtain a film thickness of 2.05 mm. However, this invention is not limited to this film thickness. Namely, it is possible to form a liquid film having any desired film thickness by adjusting the quantity of feeding a chemical liquid and the moving speed of the chemical liquid delivery port.

In a developing system as explained in this example, the concentration of chemical liquid may occasionally be lowered due to the water vapor employed for the hydrophilic treatment. Therefore, it may be advisable to transfer an alkaline or acid solution having a concentration which would not bring about a reaction in the surface-modifying liquid, by using a nitrogen gas as a carrier gas. When such a chemical liquid is employed, it is possible to quickly shift the process to the chemical liquid treatment step.

When a developing solution having a pH of 13.4 to 13.8 is to be employed as a chemical liquid as in this example, it is advisable to transfer a liquid having a pH of about 12–13 as a concentration of the surface modifying steam by using a nitrogen gas as a carrier gas. It is also advisable to employ a developing solution having a buffering effect as a chemical liquid (a developing solution). When a developing solution having a buffering effect is employed, a surface modifying liquid may be left remain immediately after the feeding of the developing solution, so that even if the state of treatment liquid is of low concentration, the recovery in concentration of the treatment liquid can be brought about due to the buffering effect of the chemical liquid being fed, thereby dissipating a difference of concentration that has been caused due to a residual surface modifying liquid.

As for the developing solution having a buffering effect, a solution of TMAH containing a little quantity of a salt to be derived from the TMAH and a weak acid.

By the way, when an acid (such as hydrofluoric acid) is employed as a chemical liquid also, it is advisable to employ, as a surface modifying liquid, an acid having a larger pH value than that of the treatment liquid and also having a buffering property (for example, a mixed solution comprising hydrofluoric acid and ammonium fluoride).

EXAMPLE 5

Figure 20A:
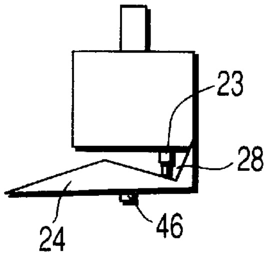
FIGS. 20A to 20G illustrate the process of treating a substrate according to Example 5.

This example relates to a method wherein light is irradiated to the main surface of substrate immediately before feeding a chemical liquid to the main surface of substrate, this method being suited for manufacturing a mask for exposure. In this case, the substrate-treating device is constructed such that in addition to the structure shown in FIGS. 9A to 9G, a light-irradiating section 46 is attached to the back surface (a surface facing the substrate) of the chemical liquid-transporting plate 24 as shown in FIG. 20A. Namely, a vacuum UV light for instance is enabled to be irradiated from this light-irradiating section 46. The structural elements other than this light-irradiating section 46 as well as the operation thereof are the same as those shown in FIGS. 9A to 9G.

Next, the application of this device to the manufacture of the mask for exposure will be explained.

The main surface of the substrate is constructed such that a chromium film and a chromium oxide film are laminated in order on the main surface of a quartz substrate of 6-inch square and about 6 mm in thickness, and then, an electron beam resist film is deposited on the top of the laminate body. Then, by making use of an electron beam exposure apparatus, the electron beam resist film was exposed, and after being released from vacuum, the main surface of the substrate was subjected to a baking treatment. Subsequently, the developing treatment thereof was performed in the same manner as employed in Example 4, thereby selectively exposing the chromium oxide film.

Then, the resultant substrate was transferred to a chromium etching apparatus as an apparatus of this example. In this chromium etching apparatus, a chemical liquid-transporting plate 24 formed of a quartz plate having a sharpened tip end 10° in angle was employed as shown in FIGS. 20A to 20G. In this case, a chemical liquid was fed to the surface of the substrate, while concurrently moving the chemical liquid feeder 20 and the chemical liquid-transporting plate 24 at a speed of 85 mm/sec. with the chemical liquid-transporting plate 24 being fixed relative to the chemical liquid feeder 20.

Figure 20E:
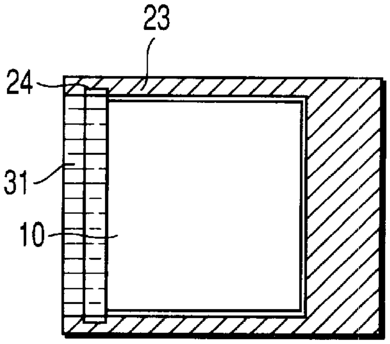
Figure 20B:
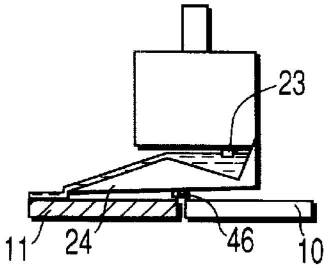

The timing of feeding the chemical liquid, and the scanning of the chemical liquid feeder 20 and chemical liquid-transporting plate 24 may be the same. Namely, when the chemical liquid feeder 20 and the chemical liquid-transporting plate 24 are placed over the auxiliary plate 11 which is disposed on the left side of the substrate 10, the feeding of chemical liquid is initiated, and a portion of the chemical liquid 31 that has been overflowed from the chemical liquid trap 28 is allowed to run along the main surface of the chemical liquid-transporting plate 24, thus feeding the chemical liquid 31 to the surface of the auxiliary plate 11 (FIGS. 20B and 20E).

Figure 20F:
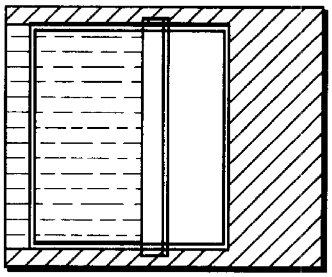
Figure 20C:
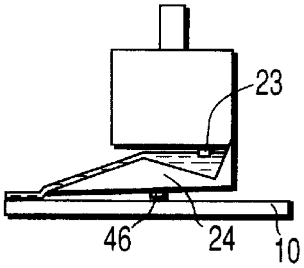
Figure 20G:
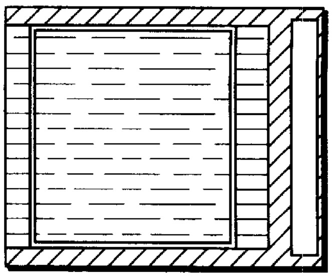
Figure 20D:
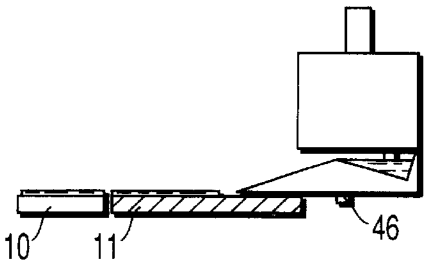

At the moment when the flow of the chemical liquid 31 on the auxiliary plate 11 is well-ordered, the movement of the chemical liquid-transporting plate 24 (and the chemical liquid feeder 20) is initiated, thus allowing it to pass over the substrate 10 (FIGS. 20C and 20F). At the moment when the left edge (a chemical liquid-feeding point) of the chemical liquid-transporting plate 24 has moved through the surface of the substrate 10 to the auxiliary plate 11, the discharging of the chemical liquid 31 is suspended and at the same time, the moving of the chemical liquid-transporting plate 24 is also suspended (FIGS. 20D and 20G).

For the purpose of removing the residual resist left on the chromium oxide surface, the light-irradiating section 46 for irradiating a vacuum UV light having a wavelength of 175 nm is attached to the back surface of the chemical liquid-transporting plate 24. Namely, by the irradiation of light to the main surface of the substrate 10 from this light-irradiating section 46, ozone is caused to generate from air existing between the light-irradiating section 46 and the main surface of the substrate 10. Therefore, by making use of this ozone and the irradiation of light of 175 nm wavelength, the resist is selectively removed at first, and then, the residual resist slightly left on the exposed surface of the chromium oxide film is completely removed.

In fact, the chemical liquid was fed to the main surface of the substrate 10 from the main surface of the chemical liquid-transporting plate 24 at a flow rate of 2 L/min., while removing the residual resist left on the exposed surface of the chromium oxide film by making use of the back surface of the chemical liquid-transporting plate 24 as explained above, thereby forming a liquid film. The thickness of the liquid film was 2.05 mm. After finishing the developing treatment of 90 seconds, the liquid film was substituted by pure water and then, spin-dried, thus forming a chromium pattern having a line width of 480 nm (a quadruple mask).

The dimensional uniformity of the line portion of the 600 nm line-and-space pattern formed in this example was enabled to be confined to $3\sigma<10$ nm in the portion inside the 8-inch wafer.

By the way, according to the conventional method wherein a chemical liquid was fed under a high pressure and turbulent flow, the dimensional uniformity was $3\sigma=10$ nm or so, thus indicating that it was possible, according to the method of this example, to reduce the working uniformity to a half. According to this example, the conditions for development were determined so as to obtain a film thickness of 2.05 mm. However, this invention is not limited to this film thickness. Namely, it is possible to form a liquid film having any desired film thickness by adjusting the quantity of feeding a chemical liquid and the moving speed of the chemical liquid delivery port.

EXAMPLE 6

This example illustrates one example wherein the method of this invention is applied to a developing method of a resist by making use of a chemical liquid-transporting plate having a modified alumina surface. Since this invention is featured in that a chemical liquid is fed to a substrate after minimizing the flowing velocity and pressure of the chemical liquid, it is possible to attach a delivery port at the bottom of liquid reservoir or trap so as to obtain the same effects as mentioned above, provided that there is such a liquid reservoir or trap as means for realizing the aforementioned object.

Namely, the substrate-treating device according to this example is featured in that a change-over valve 47 is attached to the inlet side of the chemical liquid feeder 20, thereby making it possible to suitably select two kinds of chemical liquid. The chemical liquid-transporting plate 24 is constructed to comprise the chemical liquid trap 28, and the chemical liquid delivery port 48 is disposed at a lower portion of the chemical liquid trap 28.

In this case, the angle of the tip end of the chemical liquid-transporting plate 24 was set to 11°, and angle between the mask blank for exposure for the substrate 10 and the main surface of the chemical liquid-transporting plate 24 was set to 15°. A resist film was formed on the main surface of the substrate 10, and a latent image was formed in the resist film through a light exposure.

Figure 21A:
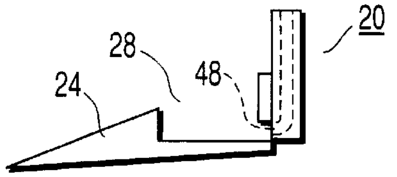
FIGS. 21A to 21E illustrate the process of treating a substrate according to Example 6.
Figure 21D:
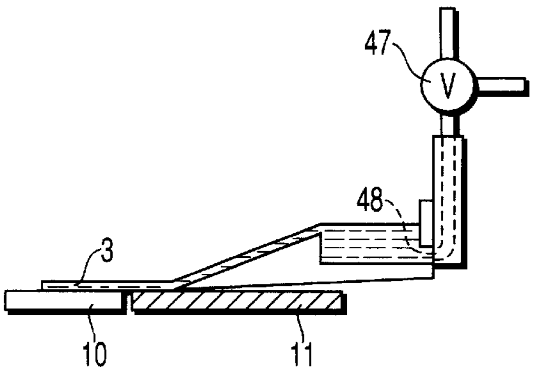
Figure 21B:
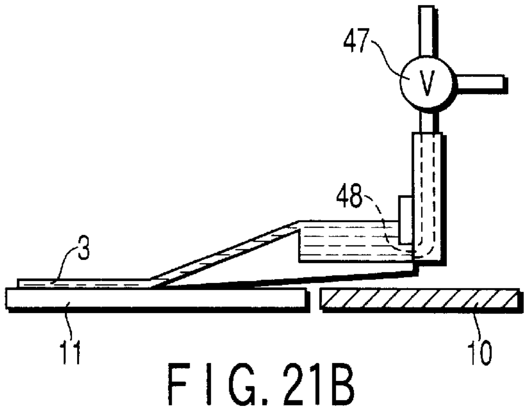

First of all, the feeding of the chemical liquid 31 to the chemical liquid trap 28 of the chemical liquid-transporting plate 24 was performed from the chemical liquid delivery port 48 (FIG. 21A). As a result, the chemical liquid trap 28 was gradually filled with the chemical liquid 31, and then, the chemical liquid 31 begun to overflow from the chemical liquid trap 28, thus allowing it to run along the main surface of the chemical liquid-transporting plate 24 (FIG. 21B).

Figure 21E:
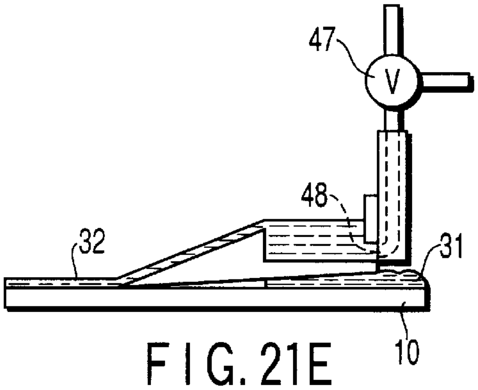
Figure 21C:
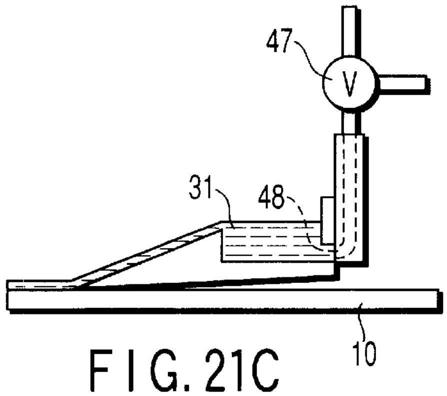

At the moment when the flow of the chemical liquid 31 on the main surface of the chemical liquid-transporting plate 24 was well-ordered, the chemical liquid-transporting plate 24 was moved at a velocity of 83 mm/sec. thereby feeding a solution of TMAH as a developing solution to the main surface of the substrate 10 (FIG. 21C). Thereafter, the feeding of the chemical liquid 31 was suspended at a location outside the substrate 10 (FIG. 21D).

After the treatment of the blank for 90 seconds, the chemical liquid-transporting plate 24 was allowed to move in the same direction as the feeding direction of the developing solution (chemical liquid 31), during which water (a second chemical liquid) was fed from the main surface of the chemical liquid-transporting plate 24 while removing the developing solution 31 by making use of the back surface of the chemical liquid-transporting plate 24, thereby suspending the development (FIG. 21E).

Further, a pure water was fed entirely to the surface of the substrate from a single nozzle which was disposed over the central portion of the substrate, thereby washing the surface of the substrate. Subsequently, the surface of the substrate was dried to remove the water.

By feeding a developing solution as performed in this example, the working precision could be prominently improved, thus making it possible to form a pattern having a line width of 130 nm with a dimensional precision of $3\sigma<4$ nm. Since the dimensional precision of pattern to be obtained according to the conventional process is: $3\sigma=15$ nm, it will be understood that the working of exposure mask blank as performed in this example is effective in prominently improving the working precision. Further, it was possible to prominently improve the property of a device which was prepared through an etching, etc. according to this example.

Figure 22:
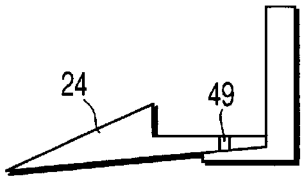
FIG. 22 is a side view illustrating a modified example according to Example 6.

In the device employed in this example, the chemical liquid delivery port 48 is disposed next to the bottom portion of the chemical liquid trap 28. Therefore, if the change-over valve 47 is disposed on the upstream side of the chemical liquid-feeding tube, the liquid in the chemical liquid trap 28 can be easily replaced by a second chemical liquid 32 by simply actuating the change-over valve 47 to allow the second chemical liquid 32 to flow therethrough after the feeding of a first chemical liquid 31. Further, the location of the chemical liquid delivery port can be suitably changed, e.g. a chemical liquid delivery port 49 may be attached directly to the chemical liquid-transporting plate 24 as shown in FIG. 22.

EXAMPLE 7

In the foregoing examples, the chemical liquid-transporting plate is designed to be moved in one direction. However, in the following examples, the chemical liquid-transporting plate is designed to be rotated as explained below.

Figure 23:
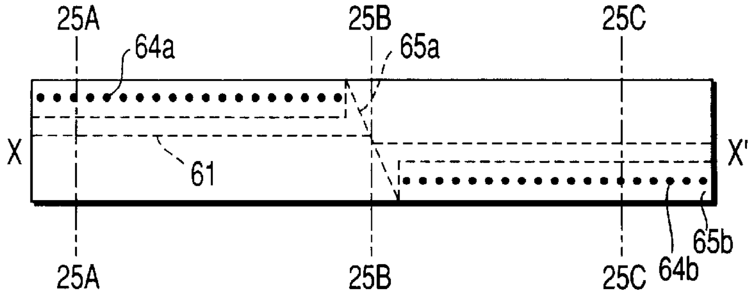
FIG. 23 is a plan view illustrating the substrate-treating device according to Example 7.
Figure 24:
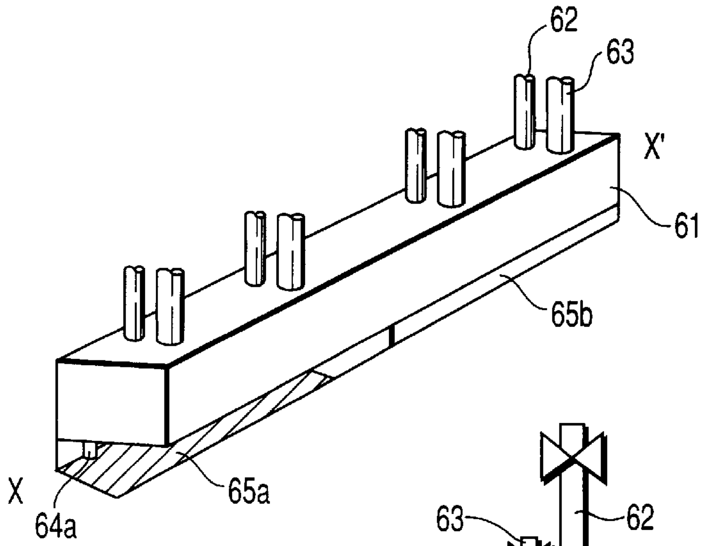
FIG. 24 is a perspective view illustrating the substrate-treating device according to Example 7.
Figure 25A:
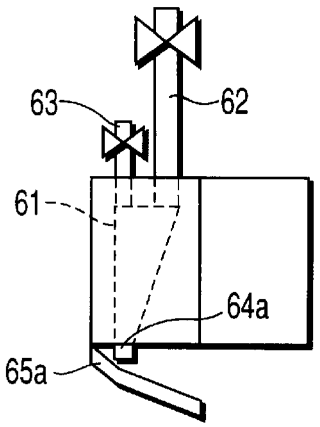
FIGS. 25A, 25B and 25C respectively shows a cross-sectional view taken along the line 25A—25A. a cross-sectional view taken along the line 25B—25B; and a cross-sectional view taken along the line 25C—25C in FIG. 23.
Figure 25B:
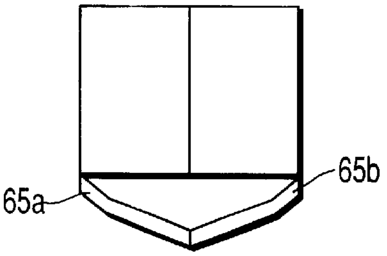

FIGS. 23, 24, 25A–25C respectively shows the construction of substrate-treating device according to a seventh example of this invention, wherein FIG. 23 is a plan view of the chemical liquid feeder; FIG. 24 is a perspective view; and FIGS. 25A, 25B and 25C respectively shows a cross-sectional view taken along the line 25A—25A, a cross-sectional view taken along the line 25B—25B, and a cross-sectional view taken along the line 25C—25C in FIG. 23.

Referring to these FIGS., a chemical liquid inlet tube 62 and an air inlet tube 63 are attached to the upper surface of an elongated chemical liquid tank 61. Further, a plurality of chemical liquid delivery ports 64 are attached to the bottom surface of an elongated chemical liquid tank 61. Although these chemical liquid delivery ports 64 are linearly arranged in general, the array of these chemical liquid delivery ports 64 is offset at the middle portion thereof, thereby forming a couple of rows which are dislocated from each other. Specifically, a row of plural number of chemical liquid delivery ports 64*a* and the other row of plural number of chemical liquid delivery ports 64*b* are mutually positioned in point symmetry about the center of the chemical liquid tank 61.

A couple of chemical liquid-transporting plates 65*a* and 65*b* each designed to transport the chemical liquid that has been discharged from the chemical liquid delivery ports 64 are disposed just below and away from each of the chemical liquid delivery ports 64*a* and chemical liquid delivery ports 64*b*. The chemical liquid feeder constituted by these members 61 to 65 is designed to be rotated about the center of the chemical liquid tank 61.

By making use of the aforementioned device and under the condition where the chemical liquid feeder is placed outside the substrate, a chemical liquid is fed from an external source disposed outside the chemical liquid feeder to the chemical liquid tank 61 of the chemical liquid feeder through the chemical liquid inlet tube 62. Then, the chemical liquid is discharged out of the chemical liquid feeder through the chemical liquid delivery ports 64*a* and chemical liquid delivery ports 64*b*, thereby feeding the chemical liquid to the surfaces of the chemical liquid-transporting plates 65*a* and 65*b* which are disposed below these ports 64*a* and 64*b* and approximately parallel with the substrate 10. The pressure and speed of the chemical liquid on the occasion of the delivery thereof from these ports 64*a* and 64*b* are alleviated by the chemical liquid-transporting plates 65*a* and 65*b*. Thereafter, the chemical liquid is allowed to run on the surfaces of the chemical liquid-transporting plates 65*a* and 65*b* so as to be transferred to the surface of substrate.

In this case, the substrate or the chemical liquid feeder is rotated at a rotational speed which makes the relative speed between the surface of substrate (wafer) and the chemical liquid approximately zero, thereby enabling a liquid film to be formed under the condition where little pressure is imposed on the treating film on the surface of substrate. By the way, the feeding of the chemical liquid will be terminated when the wafer is turned a half revolution.

Through the operation as explained above, it becomes possible to feed the chemical liquid to the surface of substrate within a short period of time and without imposing a pressure onto the surface of substrate, thereby making it possible to form a uniform liquid film all over the surface of substrate.

Figure 26:
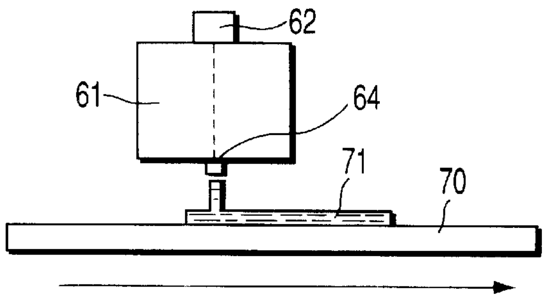
FIG. 26 is a side view illustrating the development procedures according to the prior art.
Figure 25C:
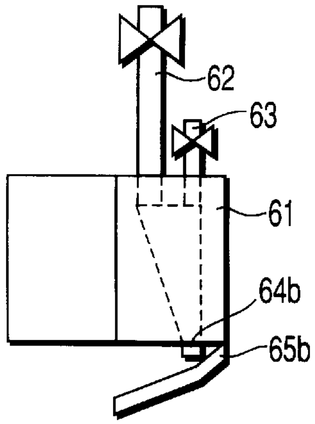

When this procedure was applied to the working of 0.13 μm pattern in a DUV beam exposure process, it was possible to confine the dimensional fluctuation to ±6 nm, thus enabling the working precision to be prominently improved. By the way, when the conventional method shown in FIG. 26 was applied only to the development treatment of a wafer that had been subjected to the same exposure process as mentioned above, the feeding direction of chemical liquid became non-uniform, thus allowing the chemical liquid and air discharged from the chemical liquid delivery ports to spread forward, resulting in a non-uniform distribution in concentration of the chemical liquid soon after the feeding of the chemical liquid. As a result, a dimensional fluctuation of ±12 nm was generated.

As for the chemical liquid-feeding plate to be employed in the chemical liquid feeder of this example, it is preferable to select those exhibiting a small contact angle in relative to the chemical liquid. In a case where an aqueous solution or an alkaline developing solution is to be employed as a chemical liquid, it is possible to employ a stainless steel member as it is or one having a finely roughened surface. In a case where an organic solvent is to be employed, a stainless steel member can be preferably employed.

With respect to the width and the angle to the surface of substrate, they are not confined to those shown in FIGS. 23, 24, 25A–25C. Namely, as long as it is possible to feed a chemical liquid at a relative speed of zero to the surface of substrate, the width can be optionally selected. As for the angle, an angle in the range of 10 to 30° is preferable. The size of the chemical liquid delivery port should preferably be in the range of 0.2 to 0.8 mm, and the density of the chemical liquid delivery ports should preferably be made higher at the region where the chemical liquid delivery port passes through the peripheral portion of the substrate.

In the case of this example, since the feeding of chemical liquid is performed while allowing the chemical liquid feeder to rotate, a larger quantity of chemical liquid is required to be fed at the peripheral portion of the substrate as compared with the central portion of the substrate. Therefore, the size of the chemical liquid delivery port may be made gradually larger as the chemical liquid delivery port is located further away from the central portion of the chemical liquid feeder. In this case, the pore diameter d' of the chemical liquid delivery port which passes through a radial portion r' (as measured from the center of the substrate) should be selected relative to the pore diameter d of the chemical liquid delivery port which passes through a radial portion r as expressed by the following equation:

$$d'=(r'/r)0.25d$$

The intervals between the centers of the chemical liquid delivery ports may be kept constant.

Figure 27:
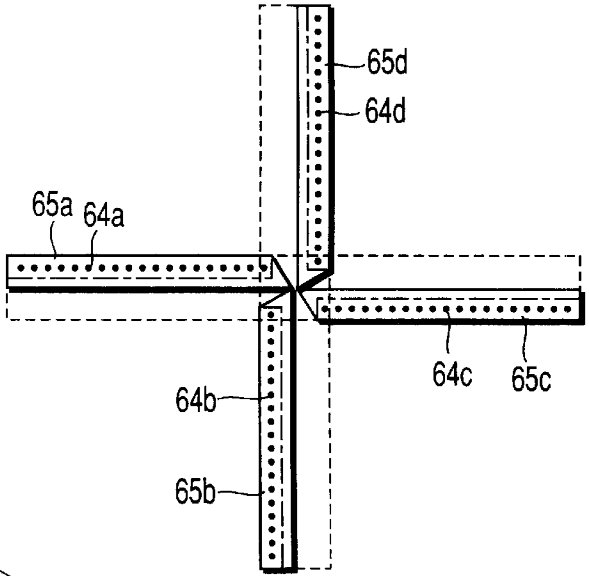
FIG. 27 illustrates an example wherein the chemical liquid-feeding port and the chemical liquid-transporting plate are arranged in cross.

With respect to the construction of the chemical liquid feeder, it is not confined to those shown in FIGS. 23, 24, 25A–25C. Namely, as long as it may be constructed in any manner as long as it comprises chemical liquid delivery ports which are disposed symmetrically with respect to the center of substrate as the substrate is treated, and a chemical liquid-feeding plate disposed below the chemical liquid delivery ports. For example, as shown in FIG. 27, the chemical liquid-transporting plates 65*a* and 65*b* may be disposed so as to orthogonally intersect with the chemical liquid delivery ports 64*a* and 64*b*. When the nozzle is constructed in this manner, the feeding of chemical liquid to the substrate can be accomplished by turning the chemical liquid feeder ¼ revolution.

The cross-sectional structure of the chemical liquid feeder is not confined to those shown in FIGS. 25A to 26C, but may be those shown in FIGS. 6A to 6D or FIGS. 7A to 7D. The structure shown in FIG. 25B will be altered depending on the specific configuration selected of the transporting plate.

EXAMPLE 8

On the occasion of performing the development of a resist for instance by making use of a developing solution and a substrate-treating device as shown in FIG. 7, the magnitude of dissolution after the initiation of development cannot be said as being uniform throughout the area of chip on the substrate, i.e. there are regions where the magnitude of dissolution is relatively large and regions where the magnitude of dissolution is relatively small. In the regions where the magnitude of dissolution is relatively large, a larger quantity of chemical liquid would be consumed and hence, the dissolution rate would be gradually decreased as the process is proceeded. On the other hand, in the regions where the magnitude of dissolution is relatively small, the initial dissolution rate would be retained. Therefore, if this phenomenon is left as it is, non-uniformity of working would be resulted.

Figure 28A:
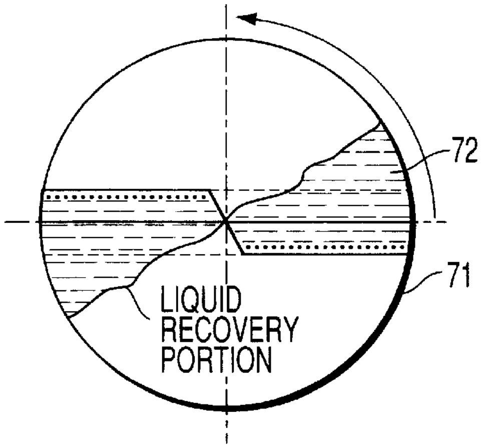
FIGS. 28A to 28D illustrate one example of the substrate-treating device according to Example 8, wherein a wafer is rotated.
Figure 28B:
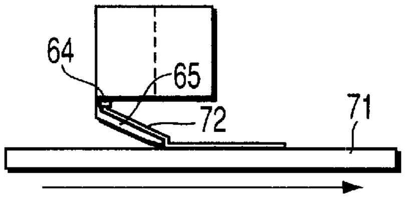
Figure 28C:
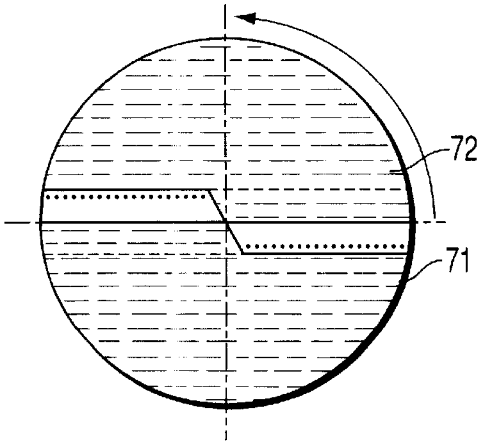
Figure 28D:
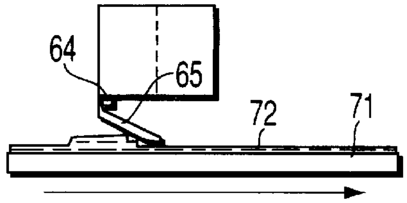

Accordingly, in this example, the stirring of chemical liquid is performed following the feeding of the chemical liquid. Specifically, the chemical liquid feeder is utilized for the stirring of chemical liquid, wherein a substrate 71 (wafer) is rotated in the direction of the arrow, and the chemical liquid 72 is moved (pushed) by means of the back surface of the chemical liquid feeder 65 as shown in FIGS. 28A to 28C. Namely, FIGS. 28A and 28C show respectively a plan view, and FIGS. 28B and 28D show respectively a side view which corresponds to FIGS. 28A to 28C, respectively.

Further, the rotational speed of substrate should preferably be about 20 to 50 rpm. Namely, when the rotational speed of substrate was less than 20 rpm, it was impossible to recognize the moving of the chemical liquid. On the other hand, when the rotational speed of substrate was higher than 50 rpm, the chemical liquid on the wafer was dispersed out of the wafer due to the centrifugal force, thereby rather deteriorating the uniformity of working.

In this example, it is designed to rotate the substrate (wafer) on the occasion of feeding or stirring a chemical liquid. However, the chemical liquid feeder may be rotated as shown in FIGS. 29A to 29D, or alternatively, both the chemical liquid feeder and the substrate may be rotated. In any case, it should be designed such that the chemical liquid feeder is moved in a direction opposite to the feeding direction of chemical liquid on the occasion of feeding the chemical liquid, and that the chemical liquid is pushed by making use of the back surface of the chemical liquid-feeding plate the occasion of mixing the chemical liquid.

By the way, the configuration of the chemical liquid feeder may be modified as those shown in FIGS. 6A to 6D or FIGS. 7A to 7D. Although this example is directed to the employment of a development process, this invention is not limited to this example, but is also applicable to a wet etching process.

Examples 7 and 8 can be applied to the coating of a resist. For example, in the same manner as explained in Example 7, a solution of resist adjusted to contain 0.1 to 10% of solid matter is employed as a chemical liquid, and then, a liquid film is formed on the surface of substrate. If the resultant resist film is non-uniform, the substrate or the chemical liquid-feeding nozzle is rotated as explained in Example 8 so as to stroke the surface of the resultant resist film by making use of the back surface of the chemical liquid-transporting plate.

When the uniformity of the liquid film is achieved, the substrate is heated to remove any redundant solvent, thereby forming a resist film. This procedure can be applied to any kind of process which involves a coating of a liquid matter and a drying thereof as in the case of forming an anti-reflection film or an interlayer insulating film such as SOG. Further, this procedure differs from the conventional rotational coating in the respect that most of solid matter can be retained on the surface of substrate in the formation of a film, thereby making it possible to greatly reduce the manufacturing cost.

EXAMPLE 9

This example relates to a wet etching method using a solution of ammonium cerium (II) nitrate wherein the substrate-treating device constructed as shown in FIGS. 23, 24, 25A–25C was employed. This method is fundamentally the same as that of Example 2, but differs in that the chemical liquid-transporting plate in this substrate-treating device was rotated in contrast to the linear movement of the chemical liquid-transporting plate in Example 2.

In the same manner as explained in Example 2, a synthetic quartz was employed for the preparation of the chemical liquid-transporting plate, and the angle of the tip end of the chemical liquid-transporting plate was set to 11°. Further, the angle between the main surface of the chemical liquid-transporting plate and an exposure mask blank for the substrate was set to 12.3°. The main surface of the mask blank was deposited with a Cr film on which a resist pattern was formed.

First of all, at the location outside the mask blank, the feeding of the chemical liquid to the chemical liquid-holding means of the chemical liquid-transporting plate was initiated from the chemical liquid delivery port. As a result, the chemical liquid-holding means was gradually filled with the chemical liquid. Thereafter, the chemical liquid was caused to overflow from the chemical liquid-holding means, thus allowing it to run along the main surface of the chemical liquid-transporting plate.

Figure 29A:
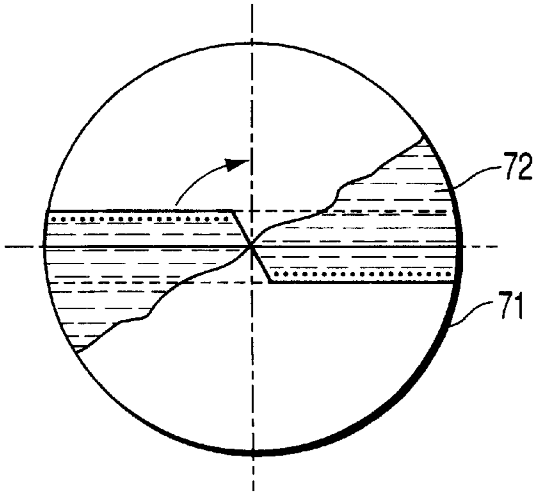
FIGS. 29A to 29D illustrate another example of the substrate-treating device according to Example 8, wherein a nozzle is rotated.
Figure 29B:
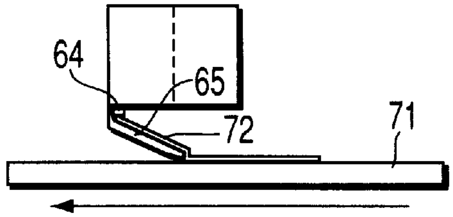

At the moment when the flow of the chemical liquid on the main surface of the chemical liquid-transporting plate was well-ordered, the chemical liquid-transporting plate was rotated at a rotational velocity of 8 rpm (peripheral velocity: 83 mm/sec.), thereby feeding a solution of ammonium cerium (II) nitrate as an etching liquid to the main surface of the blank (FIGS. 29A and 29B).

Figure 29C:
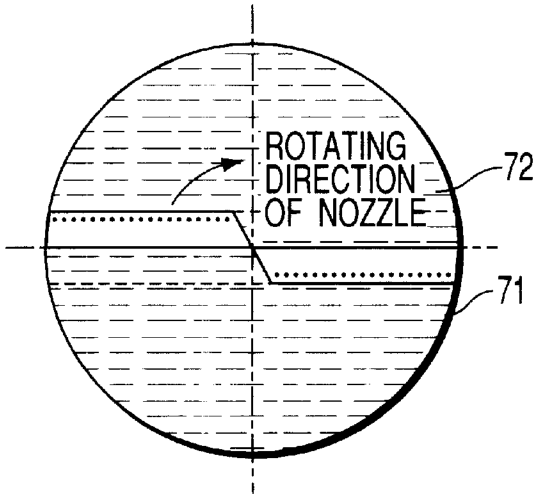
Figure 29D:
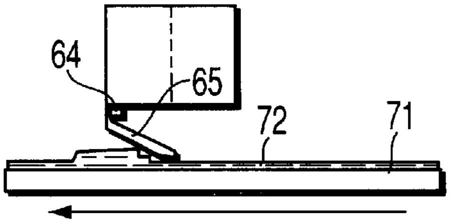

After the treatment of the blank for 60 seconds, the chemical liquid-transporting plate was allowed to shift in the same direction as the feeding direction of the etching liquid as shown in FIGS. 29C and 29D, during which water was fed from the main surface of the chemical liquid-transporting plate while removing the etching liquid by making use of the back surface of the chemical liquid-transporting plate, thereby suspending the etching.

Further, a pure water was fed entirely to the surface of the substrate from a single nozzle which was disposed over the central portion of the substrate, thereby washing the surface of the substrate. Subsequently, the surface of the substrate was dried to remove the water.

By feeding an etching liquid as performed in this example, the working precision could be prominently improved, thus making it possible to form a pattern with a dimensional precision of $3\sigma<7$ nm. Since the dimensional precision of pattern to be obtained according to the conventional process is: $3\sigma=15$ nm, it will be understood that the working of exposure mask blank as performed in this example is effective in prominently improving the working precision. Further, with respect to semiconductor device such as SRAM, DRAM, logic, etc. that have been fabricated by making use of the exposure blank prepared in this manner, it was possible to improve the non-uniformity of electric properties, thus making it possible to further miniaturize a semiconductor chip.

Although the chemical liquid was fed to the substrate while feeding the chemical liquid from the chemical liquid delivery port onto the chemical liquid-holding means that has been formed on the main surface of the chemical liquid-transporting plate, there is not any particular limitation regarding the feeding method of the chemical liquid. Namely, the chemical liquid-feeding system may be modified as shown in FIGS. 11A to 11E, and FIGS. 12A and 12B.

It is also possible to movably attach a chemical liquid-discharging means to a portion of the chemical liquid-holding means so as to allow the chemical liquid to overflow from the chemical liquid-holding means.

As for this chemical liquid-discharging means, it may be selected from the embodiments (1) to (3) explained in Example 2.

It should be understood that this invention is not limited to the aforementioned examples, but may be variously modified within the spirit of this invention.

As explained above, according to this invention, the chemical liquid supplier is disposed below the chemical liquid delivery port of the chemical liquid feeder, and away from the chemical liquid delivery port, thereby enabling the chemical liquid discharged from the chemical liquid delivery port to be once received by the chemical liquid-transporting face, subsequently allowing the chemical liquid to flow via the chemical liquid-transporting face to the substrate, thus making it possible to minimize the feeding pressure of the chemical liquid against the substrate. As a result, it becomes possible to ensure a high working precision of the substrate. In particular, since the feeding velocity of the chemical liquid being transferred from the chemical liquid supplier to the substrate can be made almost identical with the relative moving velocity of the transporting means, it is possible to reduce the feeding pressure of chemical liquid to the surface of substrate to nearly zero on the occasion of feeding the chemical liquid to the substrate, thereby making it possible to further improve the working precision of the substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A substrate-treating method, which comprises the step of:

supplying a chemical liquid from a chemical liquid supplier to a substrate to be treated while linearly moving the chemical liquid supplier from one end of the substrate to another end of the substrate, thereby forming a chemical liquid film on a main surface of the substrate, wherein a relative moving speed between the substrate and said chemical liquid supplier is substantially the same with a supplying speed of the chemical liquid being fed from said chemical liquid supplier to the substrate, and a relative speed in the same direction between the chemical liquid being fed from said chemical liquid supplier to the substrate and the substrate is substantially zero, wherein an auxiliary plate is disposed around the substrate with a main surface of said auxiliary plate being positioned at a level approximately the same with that of the main surface of the substrate, and said chemical liquid supplier is moved from the portion of the auxiliary plate disposed on one side of the substrate to the portion of the auxiliary plate disposed on the opposite side of the substrate, thereby initiating the supply of chemical liquid starting from one side of the substrate and subsequently finishing the supply of chemical liquid at the opposite side of the substrate.

2. A substrate-treating method, which comprises the step of:

supplying a chemical liquid from a chemical liquid supplier to a substrate to be treated while linearly moving the chemical liquid supplier from one end of the substrate to another end of the substrate, thereby forming a chemical liquid film on a main surface of the substrate, wherein a relative moving speed between the substrate and said chemical liquid supplier is substantially the same with a supplying speed of the chemical liquid being fed from said chemical liquid supplier to the substrate, and a relative speed in the same direction between the chemical liquid being fed from said chemical liquid supplier to the substrate and the substrate is substantially zero, wherein a gas-ejecting port or a light-irradiating section is attached to a surface of said chemical liquid supplier, which faces the main surface of the substrate, for ejecting gas or irradiating light to the main surface of the substrate immediately before feeding a chemical liquid to the main surface of the substrate, thereby modifying the main surface of the substrate.

3. A substrate-treating method, which comprises the step of:

supplying a chemical liquid from a chemical liquid supplier to a substrate to be treated while linearly moving the chemical liquid supplier from one end of the substrate to another end of the substrate, thereby forming a chemical liquid film on a main surface of the substrate, wherein relative moving speed between the substrate and said chemical liquid supplier is substantially the same with a supplying speed of the chemical liquid being fed from said chemical liquid supplier to the substrate, and a relative speed in the same direction between the chemical liquid being fed from said chemical liquid supplier to the substrate and the substrate is substantially zero, wherein said step of supplying the chemical liquid from the chemical liquid supplier to the substrate comprises feeding the chemical liquid from a chemical liquid feeder to a chemical liquid-transporting face of the chemical liquid supplier, said chemical liquid-transporting face being disposed parallel with or inclined to the main surface of the substrate which is held in an approximately horizontal state, in a state where the feeding velocity and pressure of the chemical liquid in a direction orthogonal to the main surface of the substrate are reduced, and allowing the chemical liquid to run along the chemical liquid-transporting surface to supply the chemical liquid to the substrate, wherein said chemical liquid feeder is moved relative to the substrate to thereby feed a first chemical liquid to the chemical liquid-transporting face of said chemical liquid supplier, and after returning the position of said chemical liquid supplier relative to the substrate, said chemical liquid supplier is again moved relative to the substrate, thereby feeding a second chemical liquid to the main surface of the substrate through the chemical liquid-transporting face of said chemical liquid supplier while removing or moving the first chemical liquid by means of a surface of said chemical liquid supplier, which faces the substrate and on an advancing side in a moving direction.

4. The substrate-treating method according to claim 3, wherein said first chemical liquid is a chemical liquid having a pH which is lower than a pH enabling to generate a reaction thereof with the substrate, and said second chemical liquid is an alkaline chemical liquid having a pH which is the same as that enables to generate a reaction thereof with the substrate.

5. The substrate-treating method according to claim 3, wherein said first chemical liquid is an alkaline chemical liquid having a pH which is higher than a pH enabling to generate a reaction thereof with the substrate, and said second chemical liquid is an alkaline chemical liquid having a pH which is the same as that enables to generate a reaction thereof with the substrate and is higher than the pH of said first chemical liquid.

6. A substrate-treating method, which comprises the step of:

supplying a chemical liquid from a chemical liquid supplier to a substrate to be treated while linearly moving the chemical liquid supplier from one end of the substrate to another end of the substrate, thereby forming a chemical liquid film on a main surface of the substrate, wherein a relative moving speed between the substrate and said chemical liquid supplier is substantially the same with a supplying speed of the chemical liquid being fed from said chemical liquid supplier to the substrate, and a relative speed in the same direction between the chemical liquid being fed from said chemical liquid supplier to the substrate and the substrate is substantially zero, wherein said step of supplying the chemical liquid from the chemical liquid supplier to the substrate comprises feeding the chemical liquid from a chemical liquid feeder to a chemical liquid-transporting face of the chemical liquid supplier, said chemical liquid-transporting face being disposed parallel with or inclined to the main surface of the substrate which is held in an approximately horizontal state, in a state where the feeding velocity and pressure of the chemical liquid in a direction orthogonal to the main surface of the substrate are reduced, and allowing the chemical liquid to run along the chemical liquid-transporting surface to supply the chemical liquid to the substrate, wherein said step of supplying the chemical liquid to the surface of the substrate through the moving of said chemical liquid supplier from a movement-initiating position to a movement-finishing position is performed a plurality of times, and the chemical liquid existing on the surface of the substrate positioned on an advancing side of said chemical liquid supplier is sucked or pushed out by means of a surface of said chemical liquid supplier which faces the substrate on the occasion of the second and following supplying steps of the chemical liquid, thereby removing the chemical liquid out of the substrate, during which the chemical liquid is fed from the chemical liquid-transporting face of said chemical liquid supplier to the surface of the substrate disposed on a side opposite to the advancing direction of said chemical liquid supplier.

7. A substrate-treating method, which comprises the steps of:

supplying a chemical liquid from a chemical liquid supplier to a substrate to be treated while linearly moving the chemical liquid supplier from one end of the substrate to another end of the substrate, thereby forming a chemical liquid film on a main surface of the substrate; and feeding a stop solution for terminating the treatment of the main surface of the substrate by the chemical liquid to the entire main surface of the substrate from a second chemical liquid feeder which is disposed over the main surface of the substrate, wherein a relative moving speed between the substrate and said chemical liquid supplier is substantially the same with a supplying speed of the chemical liquid being fed from said chemical liquid supplier to the substrate, and a relative speed in the same direction between the chemical liquid being fed from said chemical liquid supplier to the substrate and the substrate is substantially zero.

8. A substrate-treating method, which comprises the steps of;

discharging a chemical liquid from a chemical liquid feeder to a chemical liquid-transporting face of a chemical liquid supplier, said chemical liquid-transporting face being disposed parallel with or inclined to a main surface of a substrate which is held in an approximately horizontal state, and said chemical liquid feeder having at least a couple of chemical liquid delivery ports which are mutually positioned in point symmetry with respect to the center of the substrate; and rotationally driving at least one of said substrate and said chemical liquid feeder during a moment when the chemical liquid discharged from said liquid feeder is allowed to flow over said chemical liquid-transporting face in a manner where a surface of the chemical liquid is open to ambient atmosphere;

thereby enabling the chemical liquid discharged from said chemical liquid feeder and flowing over said chemical liquid-transporting face to be fed to an entire main surface of the substrate in state where the feeding velocity and pressure of the chemical liquid are reduced due to the rotational driving of at least one of the substrate and said chemical liquid feeder, wherein a relative moving speed between the substrate and said chemical liquid supplier is approximately the same with a velocity of the chemical liquid being fed from said chemical liquid supplier to the substrate, and a relative speed in the same direction between the chemical liquid being fed from said chemical liquid supplier to the substrate and the substrate is approximately zero.

9. A substrate-treating method, which comprises the step of:

supplying a chemical liquid from a chemical liquid supplier to a substrate to be treated while linearly moving the chemical liquid supplier from one end of the substrate to another end of the substrate, thereby forming a chemical liquid film on a main surface of the substrate, wherein a relative moving speed between the substrate and said chemical liquid supplier is substantially the same with a supplying speed of the chemical liquid being fed from said chemical liquid supplier to the substrate, and a relative speed in the same direction between the chemical liquid being fed from said chemical liquid supplier to the substrate and the substrate is substantially zero, and wherein an auxiliary plate is disposed around the substrate with a main surface of said auxiliary plate being positioned at a level approximately the same with that of the main surface of the substrate and a wettability of the auxiliary plate to the chemical liquid is almost the same as a wettability of the substrate to the chemical liquid, and said chemical liquid supplier is moved from the portion of the auxiliary plate disposed on one side of the substrate to the portion of the auxiliary plate disposed on the opposite side of the substrate, thereby initiating the supply of chemical liquid starting from one side of the substrate and subsequently finishing the supply of chemical liquid at the opposite side of the substrate.

* * * * *

UNITED STATES PATENT AND TRADEMARK OFFICE

CERTIFICATE OF CORRECTION

PATENT NO. : 6,528,128 B2

DATED : March 4, 2003

INVENTOR(S) : Ito et al.

It is certified that error appears in the above-identified patent and that said Letters Patent is hereby corrected as shown below:

Column 29,
Line 15, change “wherein relative” to -- wherein a relative --.

Signed and Sealed this

First Day of July, 2003

JAMES E. ROGAN
*Director of the United States Patent and Trademark Office*